(12) United States Patent
Kim et al.

(10) Patent No.: US 12,153,478 B2
(45) Date of Patent: Nov. 26, 2024

(54) ELECTRONIC DEVICE INCLUDING STYLUS PEN FIXING DEVICE

(71) Applicant: SAMSUNG ELECTRONICS CO., LTD., Suwon-si (KR)

(72) Inventors: Sungkwang Kim, Suwon-si (KR); Yitae Kang, Suwon-si (KR); Juhyoung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 17/877,430

(22) Filed: Jul. 29, 2022

(65) Prior Publication Data

US 2023/0020857 A1 Jan. 19, 2023

Related U.S. Application Data

(63) Continuation of application No. PCT/KR2022/009921, filed on Jul. 8, 2022.

(30) Foreign Application Priority Data

Jul. 8, 2021 (KR) .................. 10-2021-0089906
Dec. 29, 2021 (KR) .................. 10-2021-0191094

(51) Int. Cl.
*G06F 1/16* (2006.01)
*G06F 3/0354* (2013.01)

(52) U.S. Cl.
CPC .......... *G06F 1/169* (2013.01); *G06F 3/03545* (2013.01)

(58) Field of Classification Search
CPC ............... G06F 3/0202; G06F 3/03545; G06F 2200/1632; G06F 1/1626
See application file for complete search history.

(56) References Cited

U.S. PATENT DOCUMENTS

| 8,242,389 B2 | 8/2012 | Chen et al. |
| 8,363,036 B2 | 1/2013 | Liang |

(Continued)

FOREIGN PATENT DOCUMENTS

| CN | 201548880 | 8/2010 |
| CN | 201845256 | 5/2011 |

(Continued)

OTHER PUBLICATIONS

Search Report and Written Opinion dated Oct. 12, 2022 issued in International Patent Application No. PCT/KR2022/009921.

(Continued)

*Primary Examiner* — James Wu
*Assistant Examiner* — Dakota M Talbert
(74) *Attorney, Agent, or Firm* — NIXON & VANDERHYE P.C.

(57) ABSTRACT

An electronic device according to various embodiments may include: a housing, a guide portion formed in the housing and having a shape corresponding to a pen input device to accommodate the pen input device, a body disposed in the housing adjacent to the guide portion, an engagement protrusion including a protrusion portion protruding from one surface of the body wherein at least a portion of the protrusion portion is disposed inside the guide portion and an engagement portion formed at an end of the protrusion portion, and an opening formed in the body portion wherein the engagement protrusion is configured to move relative to the body.

17 Claims, 24 Drawing Sheets

(56) References Cited

U.S. PATENT DOCUMENTS

| | | | |
|---|---|---|---|
| 8,390,601 B2* | 3/2013 | Liang | G06F 3/03545 |
| | | | 361/679.01 |
| 8,390,602 B2 | 3/2013 | Liang | |
| 8,502,806 B2 | 8/2013 | Liang | |
| 2006/0232571 A1 | 10/2006 | Huang | |
| 2008/0236906 A1 | 10/2008 | Foo et al. | |
| 2010/0238615 A1 | 9/2010 | Li | |
| 2011/0221711 A1 | 9/2011 | Liang | |
| 2011/0292001 A1 | 12/2011 | Liang | |
| 2012/0014043 A1* | 1/2012 | Dong | H04M 1/0283 |
| | | | 361/679.01 |
| 2012/0140409 A1* | 6/2012 | Minaguchi | G06F 1/1616 |
| | | | 361/679.55 |
| 2013/0002964 A1 | 1/2013 | Kodaira | |

FOREIGN PATENT DOCUMENTS

| | | |
|---|---|---|
| CN | 106447967 | 2/2017 |
| CN | 106527773 | 3/2017 |
| CN | 206178719 | 5/2017 |
| CN | 110602287 | 12/2019 |
| JP | 2000-207116 | 7/2000 |
| JP | 2009-510595 | 3/2009 |
| KR | 10-2004-0013642 | 2/2004 |
| KR | 10-2010-0088487 | 8/2010 |

OTHER PUBLICATIONS

Extended European Search Report for EP Application No. 22838041.6 dated Jul. 9, 2024, 12 pages.

* cited by examiner

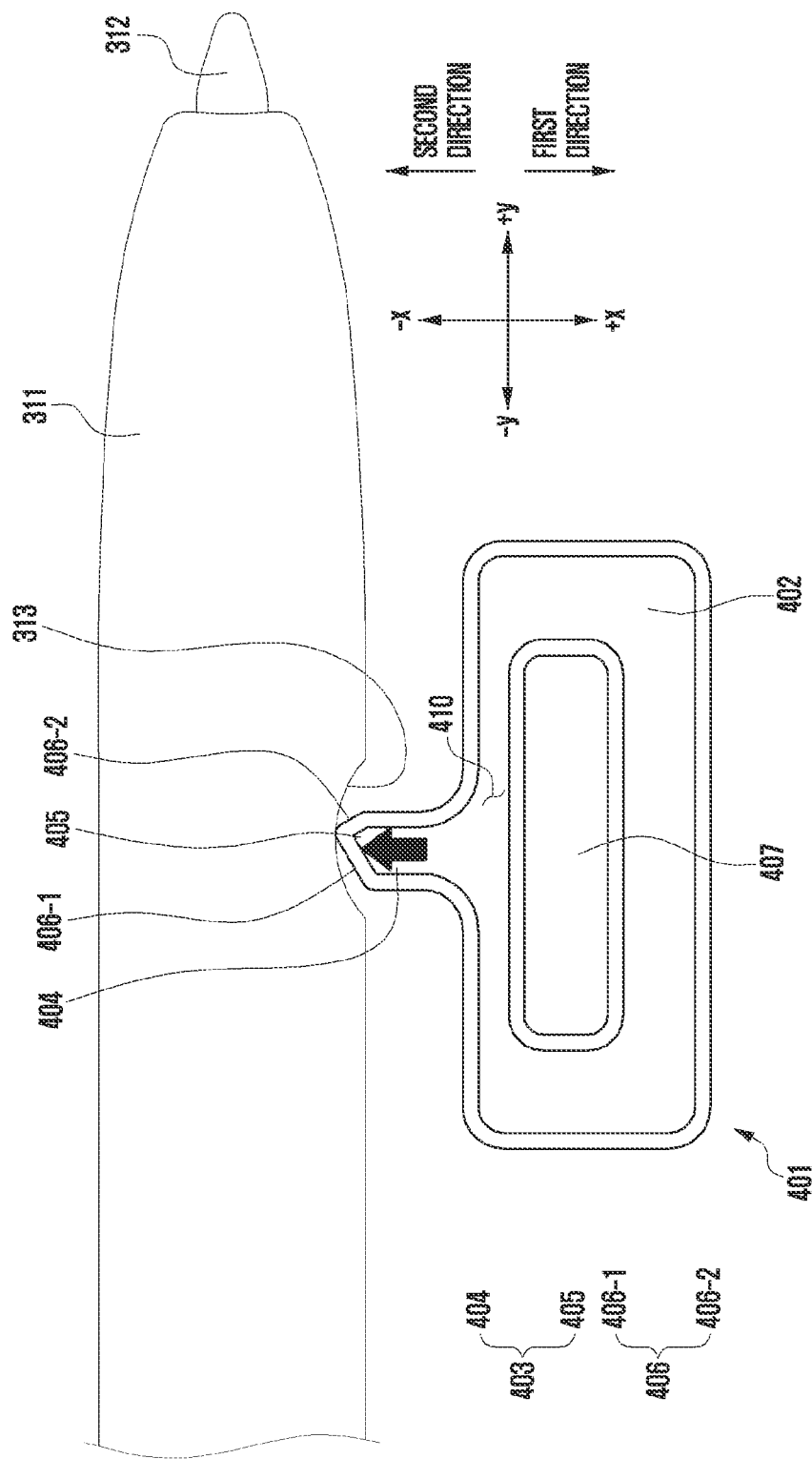

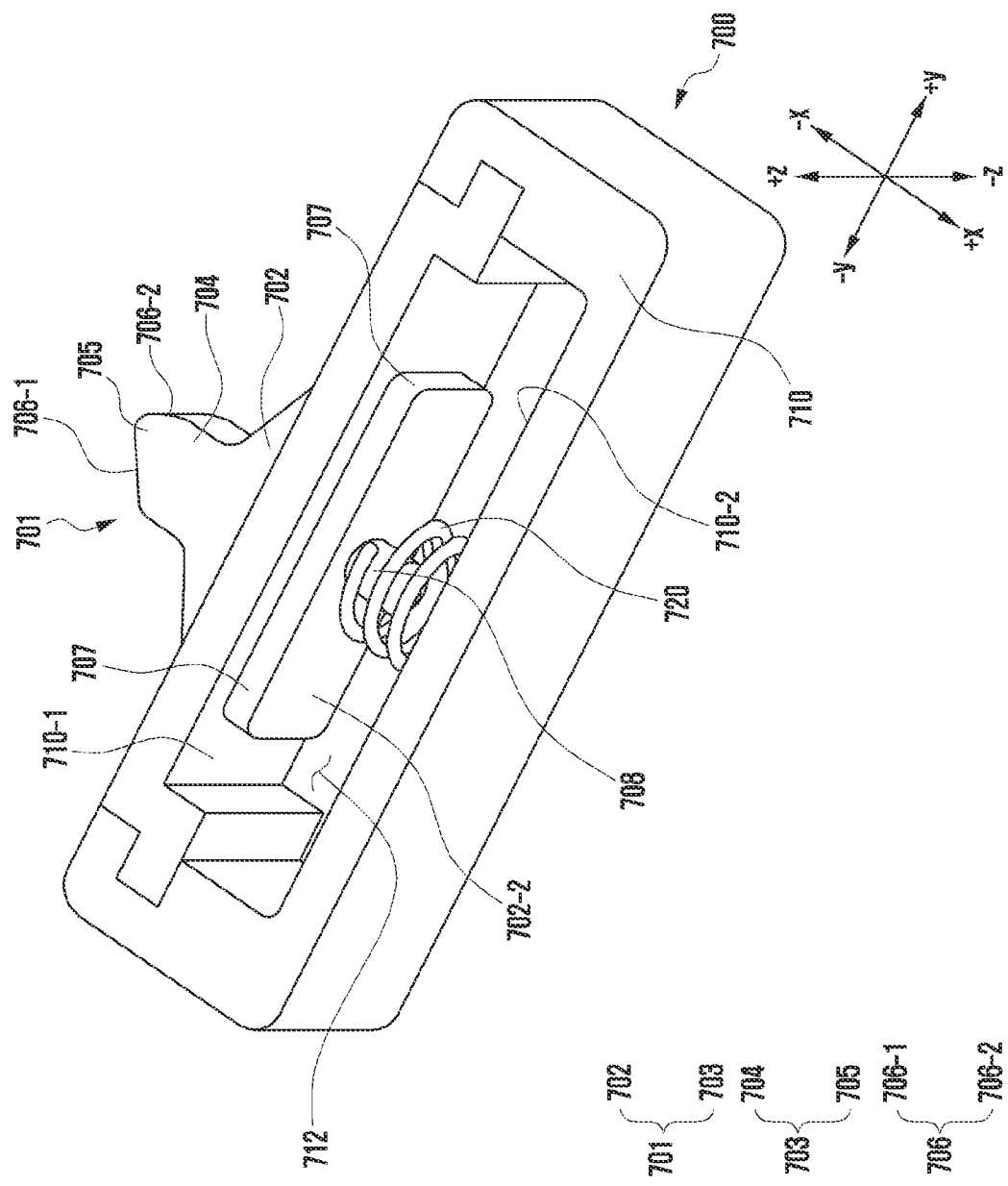

ELECTRONIC DEVICE INCLUDING STYLUS PEN FIXING DEVICE

CROSS-REFERENCE TO RELATED APPLICATIONS

This application is a continuation of International Application No. PCT/KR2022/009921 designating the United States, filed on Jul. 8, 2022, in the Korean Intellectual Property Receiving Office and claiming priority to Korean Patent Application No. 10-2021-0089906, filed on Jul. 8, 2021, in the Korean Intellectual Property Office, and to Korean Patent Application No. 10-2021-0191094, filed on Dec. 29, 2021, in the Korean Intellectual Property Office, the disclosures of all of which are incorporated by reference herein in their entireties.

BACKGROUND

Field

The disclosure relates to an electronic device including a stylus pen fixing device.

Description of Related Art

Electronic devices such as smartphones, tablet PCs, and computers may support various types of stylus pens. For example, the stylus pen may transmit and receive signals to and from a display of an electronic device in various manners such as, for example, an electro-magnetic resonance (EMR) method, an active electrostatic (AES) method, or the like. Some electronic devices may include a display module equipped with a separate element (e.g., a digitizer) for recognizing input of a stylus pen.

A receiving space for receiving the stylus pen may be provided in the electronic device, and a fixing device for fixing the stylus pen to the receiving space may be disposed inside the electronic device.

A fixing device for fixing a stylus pen may be disposed inside the electronic device. The fixing device may include a body fixed inside a housing, a head engaging with a groove formed in a portion of the stylus pen, and a neck connecting the body and the head. As the stylus pen is repeatedly inserted into and separated from the fixing device, the head and neck thereof may move repeatedly to cause plastic deformation in the corresponding portion. Thus, the fixing force of the fixing device may be lowered.

SUMMARY

Embodiments of the disclosure may provide various types of fixing devices capable of reducing plastic deformation.

An electronic device according to various example embodiments may include: a housing, a guide formed in the housing having a shape corresponding to a pen input device to accommodate the pen input device, a body disposed in the housing adjacent to the guide, an engagement protrusion including a protruding portion protruding from one surface of the body wherein at least a portion of the protrusion is disposed inside the guide and an engagement portion formed at an end of the protruding portion, and an opening formed in the center of the body wherein the engagement protrusion is configured to move relative to the body.

An electronic device according to various example embodiments may include: a housing, a guide formed in the housing having a shape corresponding to a pen input device to accommodate the pen input device, a fixing member including a body disposed in the housing adjacent to the guide portion and an engagement protrusion including a protrusion portion protruding from a first surface of the body wherein at least a portion of the protrusion portion is disposed inside the guide and an engagement portion formed at an end of the protrusion portion, and an elastic support disposed in the housing supporting a second surface opposite the first surface of the body.

According to various example embodiments, it is possible to reduce plastic deformation due to an external force applied to the fixing device by changing the shape of the fixing device.

Therefore, the fixing device may provide a constant fixing force to the stylus pen, thereby stably fixing the stylus pen.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6C is a diagram illustrating a state in which as the insertion of a pen input device into a guide portion of an electronic device is completed, an engagement protrusion and a deformation portion of a fixing device advance to the pen input device so that the engagement protrusion engages with a groove formed in the pen input device according to various embodiments;

FIG. 9A is a perspective view of a fixing device according to various embodiments;

DETAILED DESCRIPTION

Figure 1:
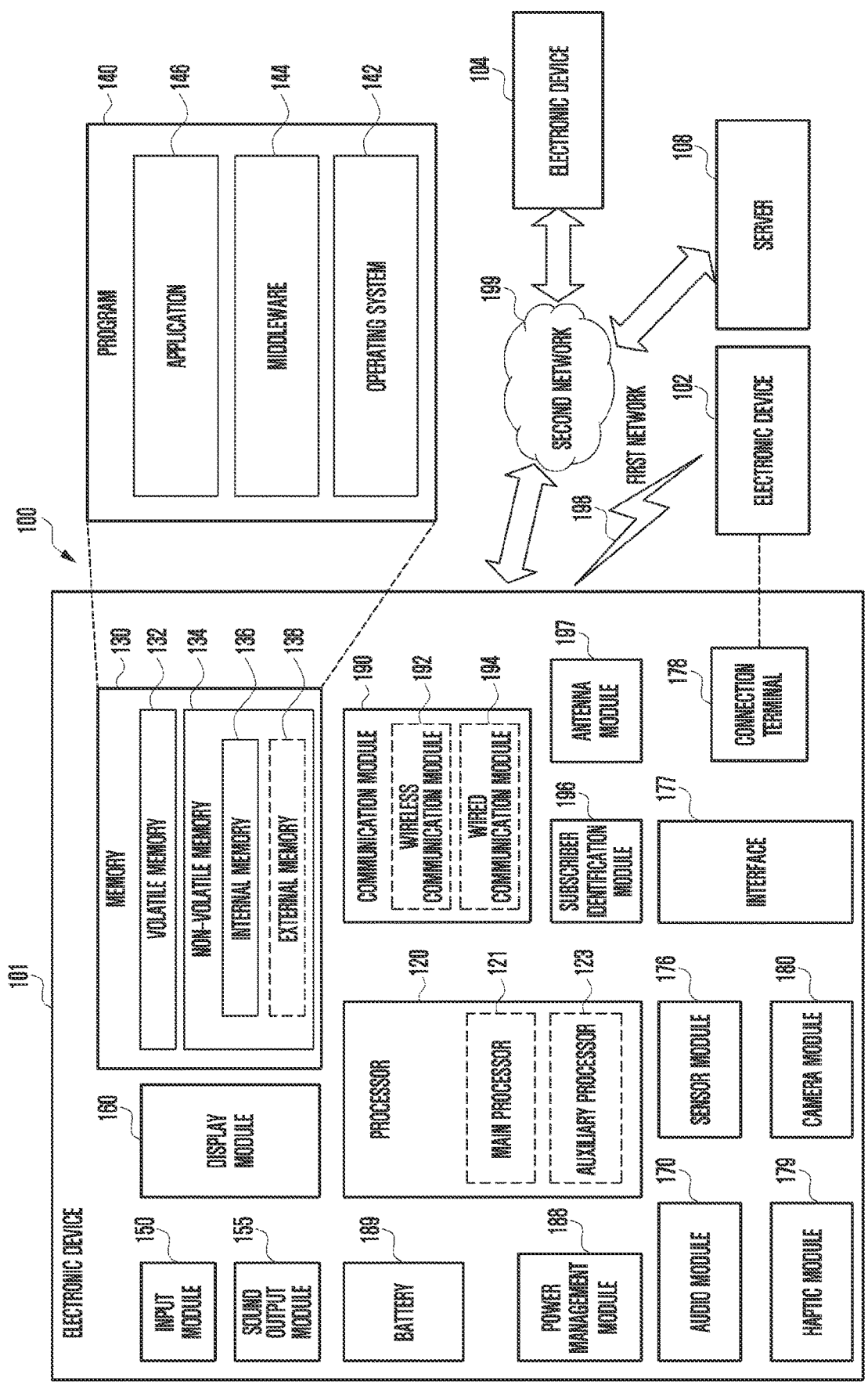
FIG. 1 is a block diagram illustrating an electronic device in a network environment, according to various embodiments.

It should be appreciated that various example embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

In the disclosure, the phrase "configured (or set) to" may be used interchangeably with, for example, the phrase "suitable for", "having the capacity to", "designed to", "adapted to", "made to" or "capable of" depending on circumstances. The term "configured (or set) to" does not necessarily refer to being "specifically designed in hardware to." Rather, in some circumstances, the phrase "device configured to" may refer to the device performing a specific operation together with other devices or parts. For example, the phrase "processor configured (or set) to perform A, B, and C" may refer, for example, to a dedicated processor (e.g., embedded processor) for performing the operations or a general-purpose processor (e.g., CPU or application processor) that can perform the operations by executing one or more software programs stored in a memory unit.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, various example embodiments of the disclosure are described with reference to the accompanying drawings. However, it should be appreciated that the disclosure is not limited to a specific embodiment and all modifications, equivalents, and/or alternatives thereof also belong to the scope of the disclosure. The same or similar reference symbols are used to refer to the same or like portions except where otherwise indicated. Further, descriptions of the same reference numerals may be omitted.

Figure 2:
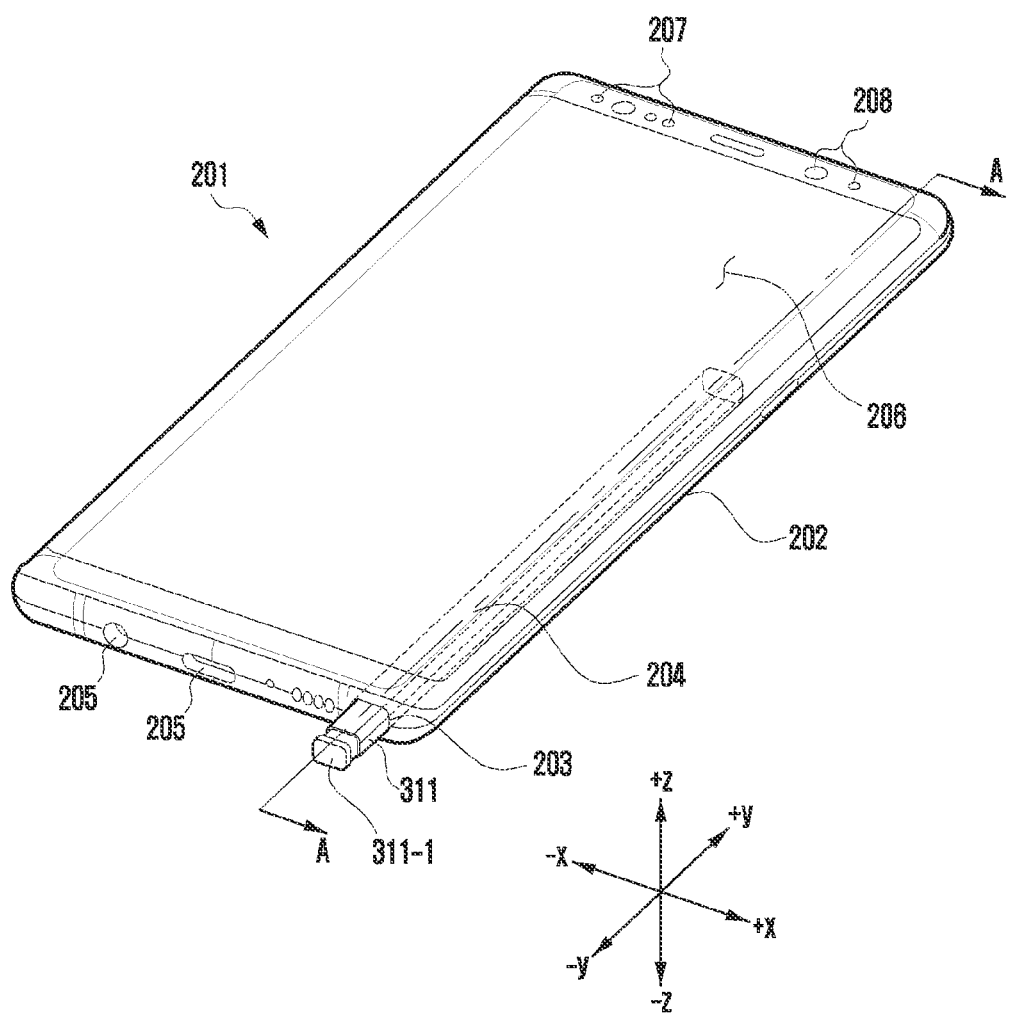
FIG. 2 is a front perspective view of an electronic device according to various embodiments.
Figure 3:
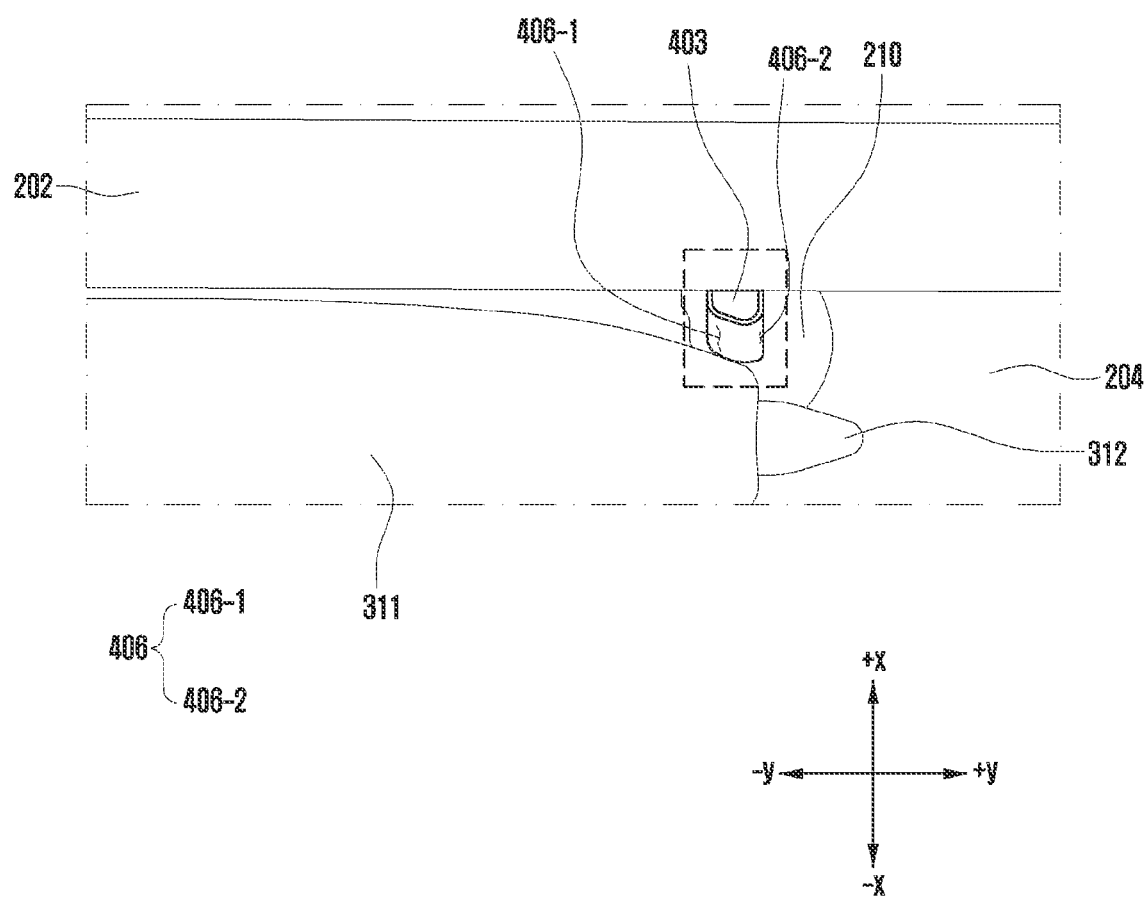
FIG. 3 is an enlarged cross-sectional view of portions of an electronic device and a pen input device taken along line A-A in FIG. 2 according to various embodiments.

FIG. 2 is a front perspective view of an electronic device 201 according to various embodiments. FIG. 3 is a diagram including an enlarged cross-sectional view of a portion of an electronic device 201 taken along line A-A in FIG. 2 according to various embodiments.

An electronic device 201 (e.g., the electronic device 101 in FIG. 1) according to various embodiments of the disclosure may include at least one of a display module (e.g., including a display) 160, a sound output module (e.g., including sound output circuitry) 155, a sensor module (e.g., including a sensor) 207, a camera module 208 (e.g., the camera module 180 including a camera), an indicator, or a connector port 205, which are disposed in a housing 202.

In the disclosure, the surface on which the display module 160 is disposed may be referred to as a front surface of the electronic device 201, the surface opposite the front surface may be referred to as a rear surface of the electronic device 201, and the surface surrounding a space between the front surface and the rear surface of the electronic device 201 may be referred to as a side surface of the electronic device 201.

In an embodiment, the housing 202 of the exterior of the electronic device 201 may have various shapes. The housing 202 may have at least one curved surface having a curvature. The side surface of the housing 202 may form the side appearance of the electronic device 201. The housing 202 may be formed to have a convex side surface. Since the side surface of the housing 202 has a curved surface, the feeling of gripping the electronic device 201 may be improved. In an embodiment, the side surface of the housing 202 may be formed to have a flat surface.

In an embodiment, the housing 202 may be formed of a variety of materials. In various embodiments, the housing 202 may be formed of a metal and/or non-metal material. The metal material may include, for example, and without limitation, alloys of aluminum, stainless steel (STS, SUS), iron, magnesium, titanium, etc., and the non-metal material may include a synthetic resin, ceramic, engineering plastic, or the like. The above-described shapes and materials of the housing 202 are only examples, and may be variously changed within a range capable of being implemented by those skilled in the art.

In an embodiment, the display module 160 may include a display panel 206 for visually displaying information, a support member (not shown) for supporting the display panel 206, and a recognition member (not shown) (e.g., a digitizer) electrically connected to the display panel 206 and capable of transmitting and/or receiving a magnetic field. A module may indicate at least one electronic component and/or device for performing at least one function or a function related to the function. The modules are merely distinguished for convenience of description, so various elements belonging to a certain module are not to be understood as being physically and electrically connected. For example, even electronic components that are physically separated from each other may be regarded as components belonging to a specific module for convenience of explanation, and even electronic components that execute different functions may be included in the same module.

In an embodiment, the sound output module 155 may include various sound output circuitry including, for example, a speaker. The sound output module 155 may include a receiver for a call connected to at least one opening formed on the front surface of the display panel 206 (e.g., the surface directed in the +Z direction in FIG. 2). In various embodiments, the sound output module 155 may include an external speaker connected to at least one opening formed on the side surface of the electronic device 201.

In an embodiment, the sensor module 207 may include at least one sensor and generate electrical signals or data values corresponding to an operation state inside the electronic device 201 or an external environmental state. The sensor module 207 may include, for example, and without limitation, at least one of a gesture sensor, a grip sensor, a color sensor, an IR (infrared) sensor, an illuminance sensor, an ultrasonic sensor, an iris recognition sensor, a distance detection sensor (a TOF sensor or a Lidar scanner), or the like.

In an embodiment, the camera module 208 may include at least one camera and be disposed at the upper end of the housing 202 (e.g., in the +Y direction in FIG. 2). The camera module 208 may include, for example, and without limitation, one or more lenses, an image sensor, an image signal processor, or the like. In various embodiments the camera module 208 may include two or more lenses (a wide angle lens and a telephoto lens) and image sensors.

In an embodiment, the connector port 205 may include a connector (e.g., a USB connector or an IF (interface connector port) module) for transmitting and receiving power and/or data to and from the external electronic device 201. In various embodiments, the connector port 205 may also perform a function for transmitting and receiving an audio signal to and from the external electronic device 201, or may further include a separate connector port 205 (e.g., an ear jack hole) for performing a function for transmitting and receiving an audio signal.

The above-described elements of the electronic device 201 are merely examples, and it does not mean that the electronic device 201 is limited to the above-described elements. In various embodiments, the electronic device 201 may exclude at least one of the above-described elements or may further include at least one other element.

According to various embodiments, as shown in FIGS. 2 and 3, a guide portion 204 may be formed inside the electronic device 201. The guide portion 204 may indicate a space formed to receive the pen input device 311 in the housing 202. The pen input device 311 may be inserted into the guide portion 204 through an insertion hole 203 formed on one side surface of the housing 202. The guide portion 204 may be formed to extend in one direction from the insertion hole 203 formed on one side surface of the electronic device 201. For example, the guide portion 204 may be formed to extend from the insertion hole 203 in the +Y direction in FIG. 2.

In an embodiment, the guide portion 204 may be formed in the housing 202 to have a shape corresponding to the pen input device 311. The guide portion 204 may be formed to have a size sufficient to accommodate the pen input device 311. For example, the insertion hole 203, which is the entrance of the guide portion 204, may be formed to be larger than the cross-sectional area of the pen input device 311. In addition, the length of the guide portion 204 (e.g., the Y-axis length thereof in FIG. 2) may be formed to be greater than the length of the pen input device 311 (e.g., the Y-axis length thereof in FIG. 2). The shape of the guide portion 204 described above is merely an example, and it does not mean that the guide portion 204 shown in FIG. 3 to be described later is limited to the shape. The shape of the guide portion 204 may be modified within a range capable of being easily implemented by those skilled in the art.

According to various embodiments, a fixing device 401 (e.g., the fixing device 401 in FIG. 5A) for fixing the pen input device 311 in the guide portion 204 may be disposed inside the housing 202. The fixing device 401 may be disposed at a position adjacent to the guide portion 204 in which the pen input device 311 is accommodated. For example, as will be described in greater detail below, a recess 501 (e.g., the recess 501 in FIG. 6A), in which a portion of the fixing device 401 is disposed, may be formed at a position adjacent to the guide portion 204 inside the housing 202. In addition, a hole 210 for connecting the guide portion 204 and the recess 501 may be formed inside the housing 202. As will be described in greater detail below, the body 402 (e.g., the body 402 in FIG. 5A) of the fixing device 401 may be disposed in the recess 501. In addition, an engagement protrusion 403 (e.g., the engagement protrusion 403 in FIG. 5A) of the fixing device 401 may pass through the hole 210 to be disposed in the guide portion 204 and to come into contact with the pen input device 311.

According to various embodiments, the pen input device 311 may be released from the electronic device 201 to the outside using a button part 311-1. In an embodiment, the pen input device 311 may include a pressable button part 311-1 at one end thereof. When the button part 311-1 is pressed, a repulsive configuration (e.g., a spring) associated with the button part 311-1 may operate so that the pen input device 311 is able to escape from the guide portion 204. In an embodiment, the button part 311-1 may include a groove structure formed therein to facilitate a user to take out the pen input device 311 using, for example, a fingernail.

Figure 4:
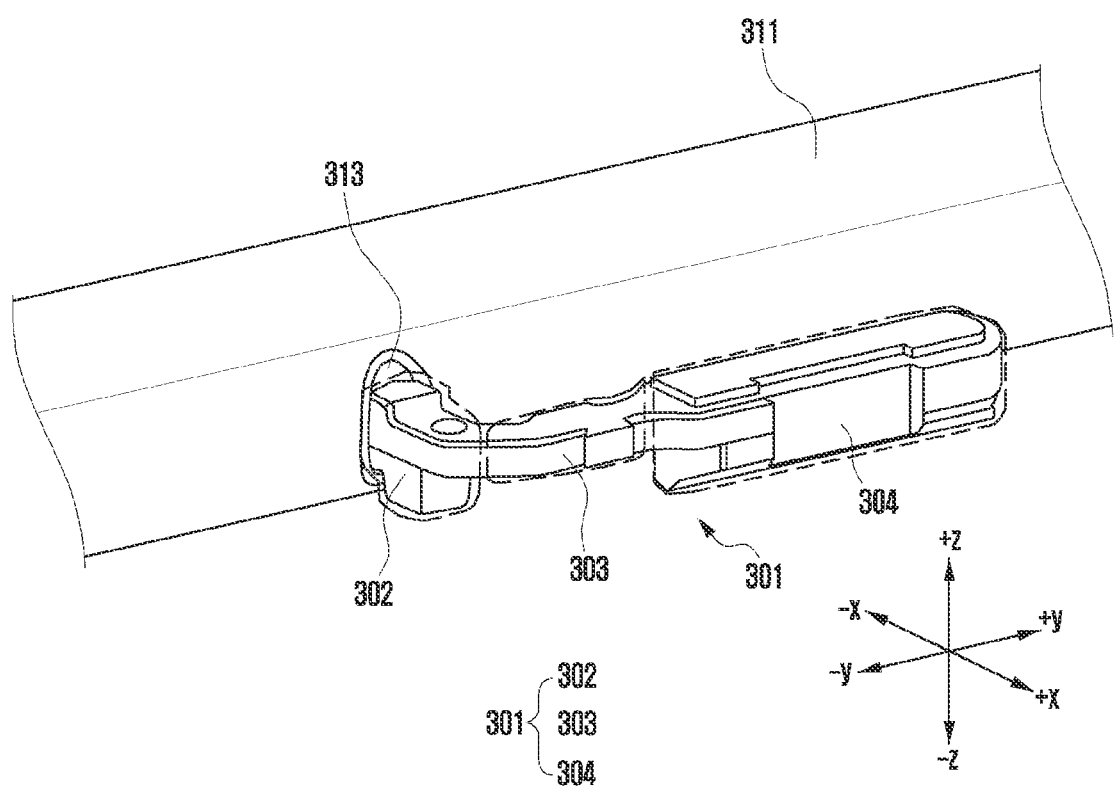
FIG. 4 is a perspective view of a fixing device according to a comparative example for fixing a pen input device inserted into an electronic device.
Figure 5A:
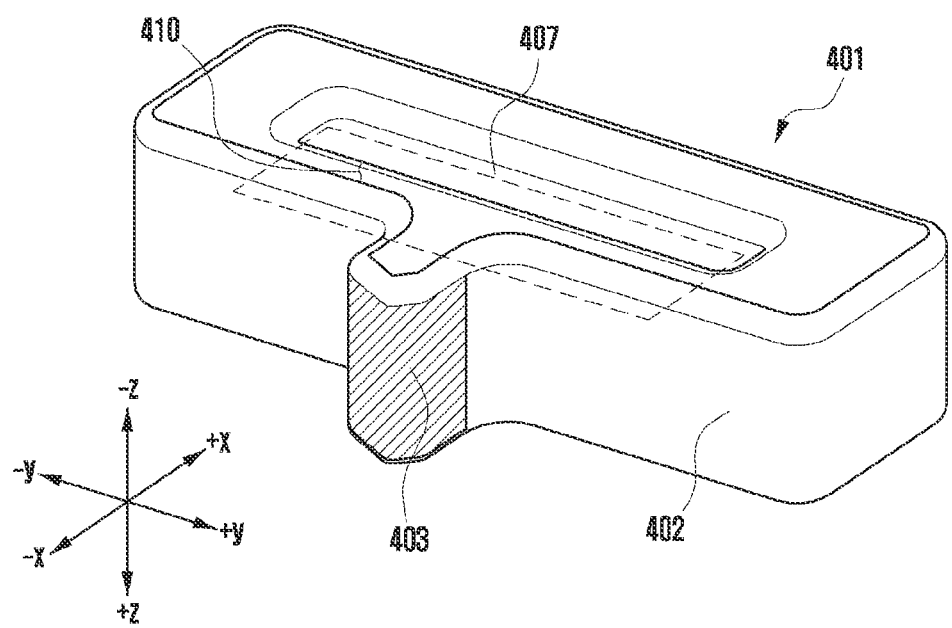
FIG. 5A is a perspective view of a fixing device according to various embodiments.
Figure 5B:
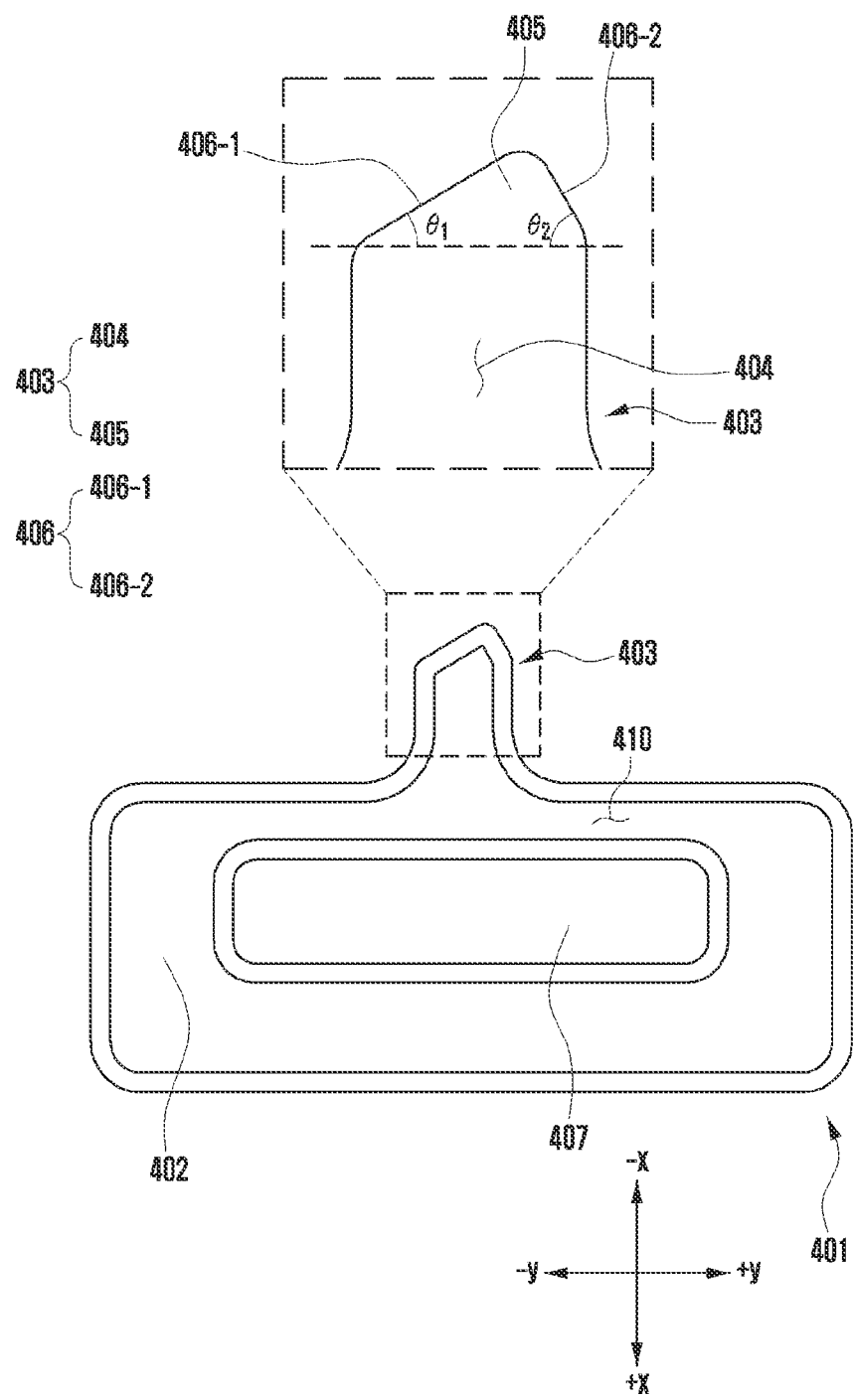
FIG. 5B is an enlarged view of an engagement protrusion of a fixing device according to various embodiments.
Figure 6A:
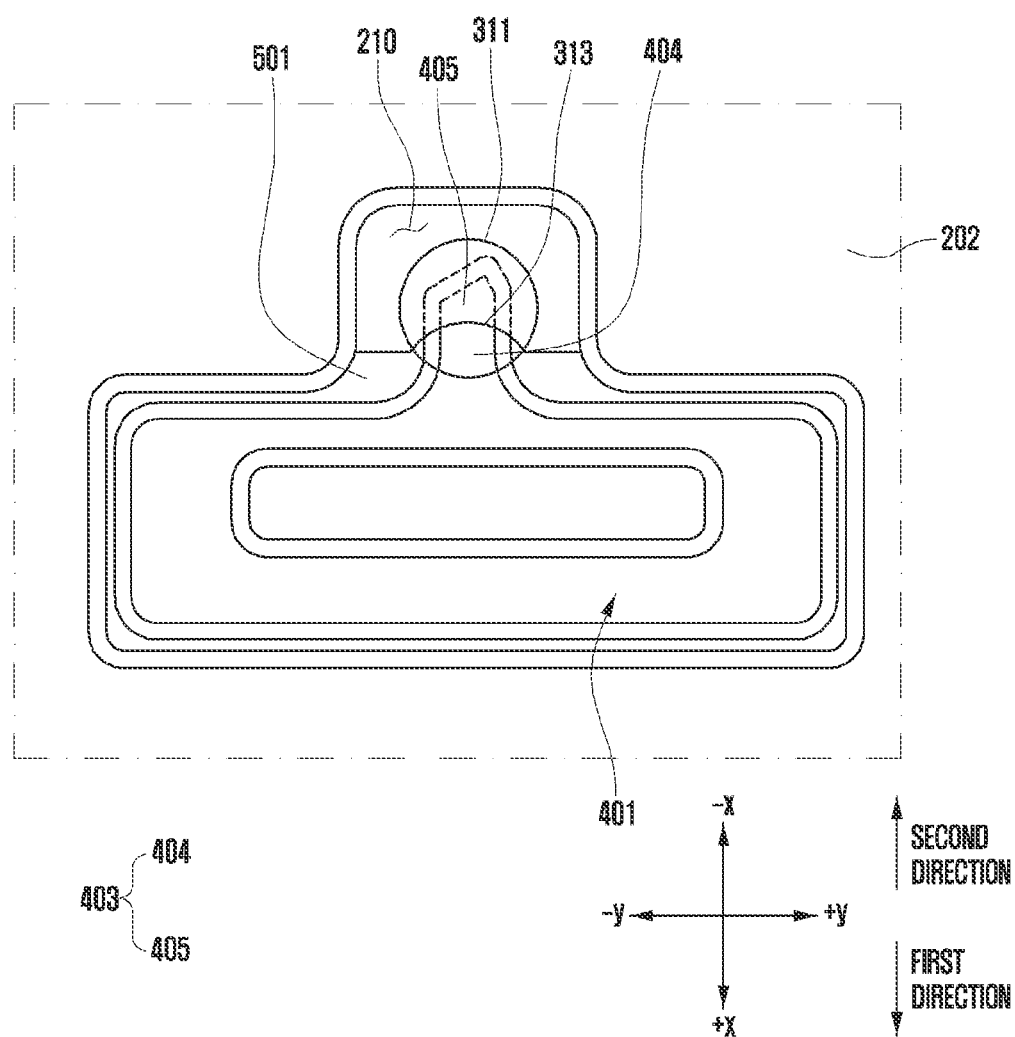
FIG. 6A is a diagram illustrating a state in which a fixing device is disposed in a recess formed in a housing and engages with a pen input device according to various embodiments.
Figure 6B:
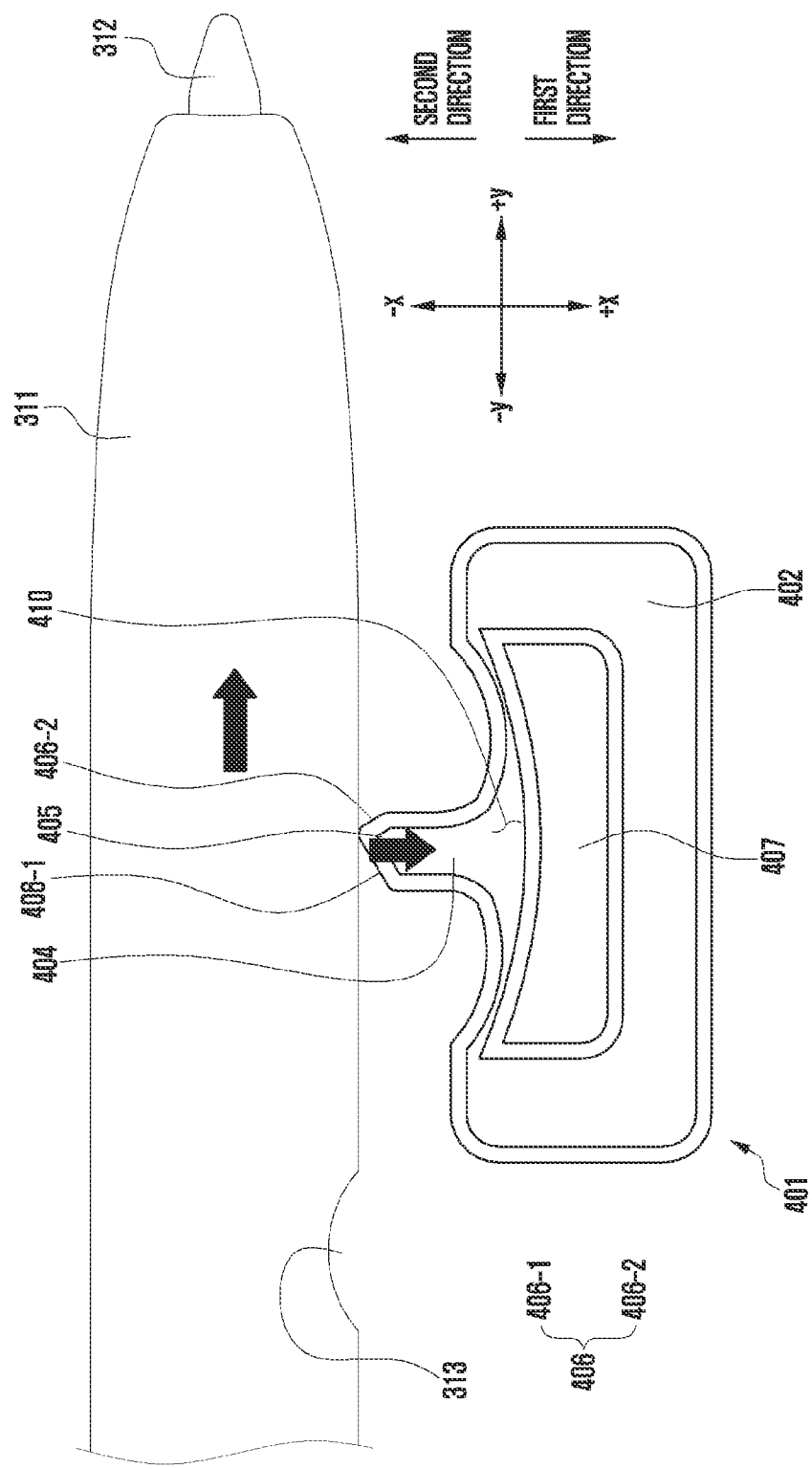
FIG. 6B is a diagram illustrating a state in which an engagement protrusion and a deformation portion of a fixing device retreat from a pen input device when the pen input device is inserted into a guide portion of an electronic device according to various embodiments.
Figure 7:
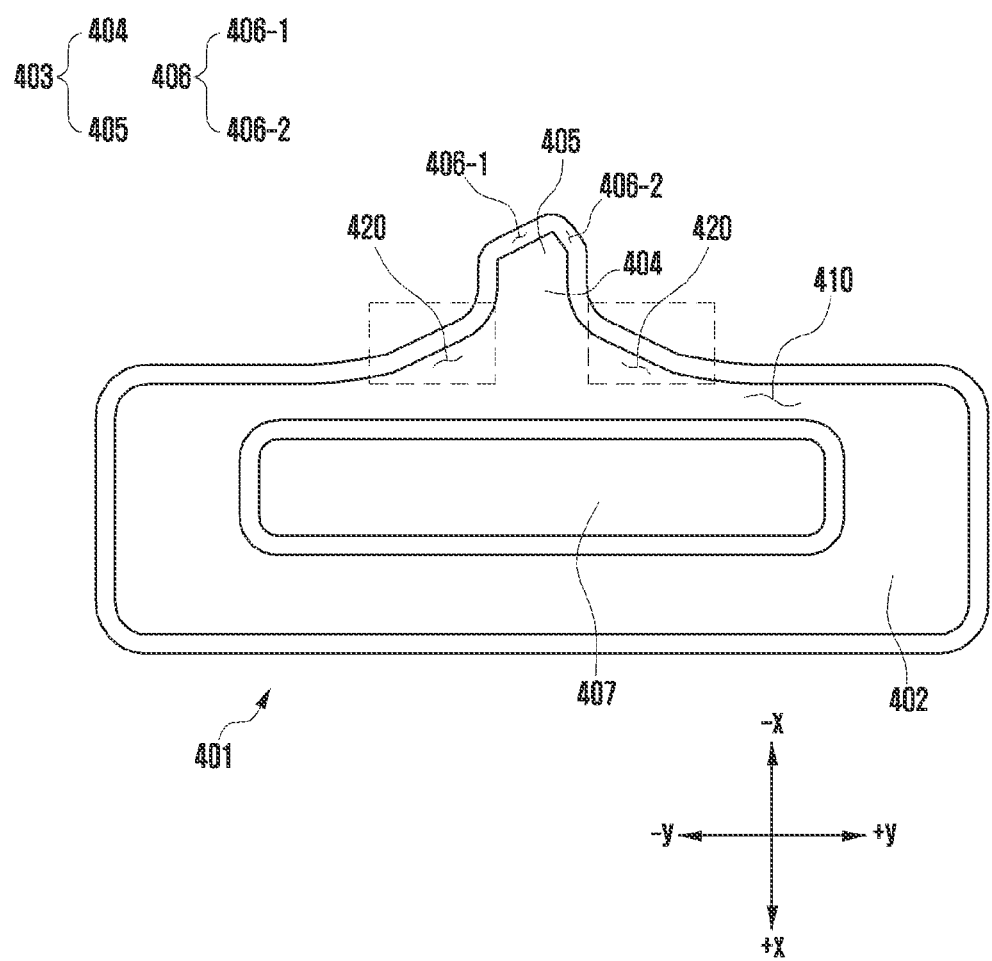
FIG. 7 is a diagram illustrating a state in which a reinforcement portion is added between a body and an engagement protrusion of a fixing device according to various embodiments.

FIG. 4 is a perspective view illustrating an example fixing device 301 according to a comparative example for fixing a pen input device 311 inserted into an electronic device 201. FIG. 5A is a perspective view of a fixing device 401 according to various embodiments. FIG. 5B is a diagram illustrating an example fixing device 401 including an enlarged view of an engagement protrusion 403 of a fixing device 401 according to various embodiments. FIG. 6A is a diagram illustrating a state in which a fixing device 401 is disposed in a recess 501 formed in a housing 202 and engages with a pen input device 311 according to various embodiments. FIG. 6B is a diagram illustrating a state in which an engagement protrusion 403 and a deformation portion 410 of a fixing device 401 move when the pen input device 311 is inserted into a guide portion 204 of an electronic device 201 according to various embodiments. FIG. 6C is a diagram illustrating a state in which as the insertion of a pen input device 311 into a guide portion 204 of an electronic device 201 is completed, an engagement protrusion 403 and a deformation portion 410 of a fixing device 401 move according to various embodiments. FIG. 7 is a diagram illustrating a state in which a reinforcement portion 420 is added between a body 402 and an engagement protrusion 403 of a fixing device 401 according to various embodiments.

According to various embodiments, a fixing device 401 for fixing the pen input device 311 in a guide portion 204 may be disposed inside a housing 202 of an electronic device 201 (e.g., the electronic device 101 in FIG. 1). Before describing the fixing device 401 according to various embodiments, a fixing device 301 according to a comparative example will be briefly described.

Referring to FIG. 4 illustrating a comparative example, the fixing device 301 of the comparative embodiment may be configured to include a body 304 fixed to a recess 501 (refer to FIG. 6A) formed at a position adjacent to the guide portion 204 inside the housing 202 to be described in greater detail below, a head 302 engaging with an engagement groove 313 formed in the pen input device 311, and a neck 320 connecting the body 304 and the head 302. In the fixing device 301 of the comparative example, when the pen input device 311 is inserted into the guide portion 204, as the head 302 comes into contact with the pen input device 311, the head 302 and the neck 303 connected to the head 302 may retreat in the +X direction relative to the pen input device 311 in FIG. 4. When the pen input device 311 is completely inserted into the guide portion 204, the head 302 and the neck 303 having retreated relative to the pen input device 311 may move to the engagement groove 313 by a repulsive force, so that the head 302 may engage with the engagement groove 313. The pen input device 311 may be fixed into the guide portion 204 through the above-described movement of the head 302 and the neck 303. However, in the structure of the fixing device 401 according to the comparative example, plastic deformation may occur in the head 302 and the neck 303 as insertion and removal of the pen input device 311 are repeated. For example, as the insertion and removal of the pen input device 311 are repeated, the head 302 and the neck 303 may repeatedly move on the X-Y plane in FIG. 4 to cause plastic deformation. If plastic deformation occurs in the head 302 and the neck 303, a problem may occur in the fixing force of the fixing device 401 to the pen input device 311. In various embodiments, the head 302 may come into excessive contact with the engagement groove 313 of the pen input device 311 so that the pen input device 311 may be excessively fixed to the electronic device 201 (e.g., the electronic device 101 in FIG. 1). In addition, in various embodiments, the head 302 may be deformed to such an extent that it is unable to engage with the engagement groove 313 of the pen input device 311, and thus the fixing force of the fixing device 401 to the pen input device 311 may be lowered. Various embodiments of the disclosure may provide a structure in which plastic deformation does not occur in the fixing device 401 even if the pen input device 311 is repeatedly inserted into or removed from the electronic device 201. Hereinafter, the structure of the fixing device 401 according to various embodiments will be described in greater detail.

According to an embodiment of the disclosure, as illustrated in FIG. 5A, the fixing device 401 may include a body (e.g., body) 402, an engagement protrusion 403, and a first opening 407. The body 402 may refer, for example, to a body of the fixing device 401. The engagement protrusion 403 may refer, for example, to a portion that is formed to protrude from one surface of the body 402 and engages with the engagement groove 313 of the pen input device 311. The first opening 407 is a space formed in the center of the body 402, which enables the engagement protrusion 403 to move relative to the body 402. The first opening 407 may be a space that connects the front surface of the body 402 (e.g., the surface directed in the +Z direction in FIG. 5A) and the rear surface opposite the front surface (e.g., the surface directed in the −Z direction in FIG. 5A).

According to various embodiments, the fixing device 401 may be partially deformed by peripheral structures of the fixing device 401. For example, the engagement protrusion 403 may be pressed when the pen input device 311 is inserted into the guide portion 204 or removed from the guide portion 204, so that a portion of the fixing device 401 may be temporarily deformed. The fixing device 401 may be formed of a material having elasticity to be deformable. In various embodiments, the fixing device 401 may, for example, and without limitation, be formed of rubber or a synthetic resin such as polyacetal (e.g., polyoxymethylene, POM).

According to various embodiments, the body 402 may include a deformation portion 410. The deformation portion 410 may refer, for example, to a portion of the body 402 where the engagement protrusion 403 is formed. Referring to FIG. 5B, the deformation portion 410 may be thinner than the remaining portions of the body 402, excluding the deformation portion 410. For example, the deformation portion 410 may be formed to have the minimum or reduced thickness in the width direction (e.g., the thickness in the X-axis direction in FIG. 5B) in the body 402. Therefore, when an external force is applied to the engagement protrusion 403, only the deformation portion 410 may move in the body 402 in response to the movement of the engagement protrusion 403 by the external force.

According to various embodiments, the deformation portion 410 may have the engagement protrusion 403 formed to protrude therefrom. In various embodiments, the engagement protrusion 403 may be formed to protrude from the center of the deformation portion 410. For example, the body 402 may be formed symmetrically with respect to the engagement protrusion 403.

In the fixing device 401 according to an example embodiment, since the engagement protrusion 403 is formed to protrude from the center of the deformation portion 410, structural stability thereof may be improved. The deformation portion 410 may support the engagement protrusion 403 on the left side (e.g., the −Y direction in FIG. 5B) of the engagement protrusion 403 and on the right side (e.g., the +Y direction in FIG. 5B) of the engagement protrusion 403, based on the engagement protrusion 403. Therefore, in the fixing device 401 of the disclosure, unlike the fixing device 301 of the comparative example illustrated in FIG. 4, even if insertion or removal of the pen input device 311 is repeated, plastic deformation due to an external force applied to the engagement protrusion 403 may be alleviated/reduced or eliminated. In addition, the deformation portion 410 may provide the same or similar elastic force to the engagement protrusion 403 on the left and right sides of the engagement protrusion 403, based on the engagement protrusion 403. Accordingly, the engagement protrusion 403 may easily move in response to the movement of the pen input device 311.

According to various embodiments, as shown in FIG. 5B, the engagement protrusion 403 of the fixing device 401 may include a protrusion portion 404 and an engagement portion 405. The protrusion portion 404 may refer to a portion that protrudes from one surface of the body 402, and may indicate the body of the engagement protrusion 403. The engagement portion 405 may refer to a portion formed at the end of the protrusion portion 404. The engagement portion 405 may be a portion where the engagement protrusion 403 is substantially caught in the engagement groove 313 of the pen input device 311.

In an embodiment, the engagement portion 405 may have different inclinations with respect to the protrusion portion 404. Referring to FIG. 5B, the engagement portion 405 may include inclines 406. The inclines 406 may include a first incline 406-1 and a second incline 406-2. The first incline 406-1 may be a portion that comes into contact with one surface of the pen input device 311 when the pen input device 311 is inserted into the guide portion 204 of the housing 202. The second incline 406-2 may be a portion that comes into contact with one surface of the pen input device 311 when the pen input device 311 is removed from the guide portion 204 of the housing 202. The inclination between the first incline 406-1 and the protrusion portion 404 may be less than the inclination between the second incline 406-2 and the protrusion portion 404. For example, the angle θ1 between the first incline 406-1 and the protrusion portion 404 may be less than the angle θ2 between the second incline 406-2 and the protrusion portion 404. In various embodiments, the angle between the first incline 406-1 or the second incline 406-2 and the protrusion portion 404 may be an acute angle. In an embodiment, the angle θ1 between the first incline 406-1 and the protrusion portion 404 may be an acute angle, and the angle θ2 between the second incline 406-2 and the protrusion portion 404 may be an obtuse angle.

In the embodiment, since the engagement portion 405 is configured such that the inclination between the first incline 406-1 and the protrusion portion 404 is gentle, the pen input device 311 may be easily inserted into the guide portion 204. In addition, since the inclination between the second incline 406-2 and the protrusion portion 404 is greater than the inclination between the first incline 406-1 and the protrusion portion 404, the pen input device 311 may not be easily removed from the part 204.

According to various embodiments, the fixing device 401 may include a first opening 407. The first opening 407 may be a space that is formed at substantially the center of the body 402 and connects the front surface of the body 402 (e.g., the surface directed in the +Z direction in FIG. 5A) and the rear surface opposite the front surface (e.g., the surface directed in the −Z direction in FIG. 5A). The first opening 407 may refer to a space formed to facilitate the engagement protrusion 403 and the deformation portion 410 to move relative to the body 402 when the pen input device 311 is inserted into the guide portion 204 or removed from the guide portion 204.

In an embodiment, referring to FIGS. 6A and 6B, as the pen input device 311 is inserted into the guide portion 204, the engagement protrusion 403 may come into contact with one surface of the pen input device 311 to be compressed. For example, the engagement protrusion 403 may be compressed in a first direction (e.g., the +X direction in FIG. 6B). Accordingly, the deformation portion 410 connected to the engagement protrusion 403 may move together with the engagement protrusion 403 in the first direction. Thus, the first opening 407 may be narrowed as the deformation portion 410 moves in the first direction. Referring to FIG. 6C, when the pen input device 311 is completely inserted into the guide portion 204, the compressed engagement protrusion 403 may engage with the engagement groove 313 of the pen input device 311 by a repulsive force. The deformation portion 410 connected to the engagement protrusion 403 may return to the shape before being compressed by the pen input device 311 by an elastic force. Accordingly, the first opening 407 may also return to its original shape.

In various embodiments, when the insertion of the pen input device 311 is complete, the engagement protrusion 403 may engage with the engagement groove 313 of the pen input device 311, so that the deformation portion 410 connected to the engagement protrusion 403 may move in a second direction (e.g., the −X direction in FIG. 6C) by an elastic force. However, since the engagement protrusion 403 is in contact with the engagement groove 313 of the pen input device 311, the deformation portion 410 may be in the state of being pressed in a first direction (the +X direction in FIG. 6C), instead of completely returning to the shape before being compressed by the pen input device 311. As the deformation portion 410 is pressed, the first opening 407 may also be pressed in the first direction (the +X direction in FIG. 6C).

In the embodiment, the engagement protrusion 403 of the fixing device 401 may come into contact with the pen input device 311 when the pen input device 311 is inserted or removed. The engagement protrusion 403 may move in a direction corresponding to the movement direction of the pen input device 311 (e.g., the Y-axis direction in FIG. 3). For example, the engagement protrusion 403 may move in the direction in which the pen input device 311 is inserted (e.g., the +Y direction in FIG. 3) or move in the direction in which the pen input device 311 is removed from the guide portion 204 (e.g., the −Y direction in FIG. 3). In addition, referring to FIG. 6B, when the pen input device 311 moves inside the guide portion 204, the engagement protrusion 403 may come into contact with one surface of the pen input device 311 to be compressed in the first direction (the +X direction in FIG. 6C). Referring to FIG. 6C, when the pen input device 311 is completely inserted into the guide portion 204, the engagement protrusion 403 may engage with the engagement groove 313 formed in the pen input device 311 to be fixed inside the electronic device 201. As the engagement protrusion 403 engages with the engagement groove 313, it may return to the position before being compressed or may be in the state of being pressed in the first direction (the +X direction in FIG. 6C). The deformation portion 410 having been compressed together with the engagement protrusion 403 may also be restored to its original shape by an elastic force or may be in the state of being pressed in the first direction (the +X direction in FIG. 6C). The pen input device 311 may be removed from the guide portion 204 or fixed into the guide portion 204 through the movement of the engagement protrusion 403 and deformation portion 410 described above.

According to various embodiments, as shown in FIG. 7, the fixing device 401 may include reinforcement portions 420. The reinforcement portions 420 may be formed between the engagement protrusion 403 and one surface of the body 402. For example, the reinforcement portions 420 may be formed between the protrusion portion 404 of the engagement protrusion 403 and the deformation portion 410 of the body 402 to support the protrusion portion 404 of the engagement protrusion 403. The reinforcement portions 420 may be formed in various shapes between the engagement protrusion 403 and the body 402. In an embodiment, the reinforcement portions 420 may be formed symmetrically with respect to the protrusion portion 404. In an embodiment, the reinforcement portions 420 may be formed asymmetrically with respect to the protrusion portion 404.

In various embodiments, the reinforcement portions 420 may support the engagement protrusion 403. The reinforcement portions 420 may support the engagement protrusion 403 when the pen input device 311 is inserted into the guide portion 204 or removed from the guide portion 204 to lower the stress concentration applied to the engagement protrusion 403. Therefore, plastic deformation that may occur in the engagement protrusion 403 due to contact with the pen input device 311 may be relieved/reduced or eliminated by the reinforcement portions 420.

The body 402, the engagement protrusion 403, and the first opening 407, which are elements of the fixing device 401 described above, are merely distinguished to explain the roles of the respective portions of the fixing device 401, and may not be actually distinguished in the fixing device 401. In an embodiment, the body 402, the engagement protrusion 403, and the first opening 407 may be integrally formed to configure the fixing device 401.

In addition, the shapes of the fixing device 401 described above are only examples, and the fixing device 401 is not limited to the shapes shown in FIGS. 5A to 7. Similarly, the first opening 407 described above is not limited to the shapes shown in FIGS. 5A to 7. The first opening 407 may have the shape of a rectangle, a circle, or a trapezoid, which may be variously modified within a range capable of being implemented by those skilled in the art.

According to various embodiments, a holder for fixing the end of the pen input device 311 may be disposed at the end of the guide portion 204. The holder may prevent or reduce the pen input device 311 from entering deeply into the electronic device 201 to such an extent that the user is unable to take the pen input device 311 out. For example, the holder may control the pen input device 311 to enter the guide portion such that the end of the button part 311-1 of the pen input device 311 reaches only the position corresponding to the insertion hole 203, which is the entrance of the guide portion 204.

In an embodiment, the pen input device 311 may be inserted into the electronic device 201 such that the pen tip 312 faces the guide portion 204. A receiving part (not shown) in which the pen tip 312 of the pen input device 311 is disposed may be formed in the holder. The pen tip 312 may be disposed in the receiving part to be protected inside the electronic device 201. In an embodiment, the holder may be made in the form of a dome. The pen tip 312 may be disposed inside the dome to be protected from an external force applied to the pen input device 311. In an embodiment, the holder may be formed of a soft material to protect the end of the pen input device 311 where the pen tip is positioned. For example, the holder may be formed of a material such as rubber or urethane, which is an elastic member.

According to various embodiments, as shown in FIG. 6A, a recess 501 may be formed at a position adjacent to the guide portion 204 inside the housing 202. The fixing device 401 may be disposed in the recess 501. The recess 501 may be formed to have a size capable of accommodating a portion of the fixing device 401. For example, referring to FIG. 6A, the recess 501 may be formed to have a size capable of accommodating the body 402 of the fixing device 401 described with reference to FIG. 5A. In an embodiment, the recess 501 may be formed to be larger than the body 402 of the fixing device 401. In an embodiment, the recess 501 may be formed to have a size corresponding to the size of the body 402.

According to various embodiments, the fixing device 401 may be fixed to the recess 501 in various ways. In an embodiment, the fixing device 401 may be fixed to the recess 501 by an adhesive material (e.g., tapes or adhesives) provided on the surface of the recess 501. In an embodiment, the fixing device 401 may include a protrusion structure (not shown) formed to protrude from one surface of the body 402. In the case where the fixing device 401 is disposed in the recess 501, the protrusion structure may be compressed by the recess 501. The fixing device 401 may be fixed to the recess 501 by generating a friction force against the recess 501 through the protrusion structure. In addition, the fixing device 401 may be fixed to the recess 501 in various ways within a range capable of being implemented by those skilled in the art.

According to various embodiments, as shown in FIGS. 3 and 6A, a hole 210 for connecting the guide portion 204 and the recess 501 may be formed inside the housing 202. A portion of the fixing device 401 may pass through the hole 210 to be disposed in the guide portion 204. For example, a portion of the engagement protrusion 403 of the fixing device 401 described in FIG. 5A may pass through the hole 210 to be disposed in the guide portion 204 and to come into contact with the pen input device 311.

According to various embodiments, the hole 210 may guide the movement of the engagement protrusion 403. For example, the hole 210 may be formed such that there is a gap against the engagement protrusion 403 to not come into contact with the engagement protrusion 403, thereby guiding the movement of the engagement protrusion 403 in a first direction (the +X direction in FIG. 6A) or a second direction (e.g., the −X direction in FIG. 6A). The engagement protrusion 403 may come into contact with one surface of the pen input device 311 when the pen input device 311 is inserted into or removed from the guide portion 204. Accordingly, the engagement protrusion 403 may move in a direction corresponding to the movement direction of the pen input device 311 (e.g., the Y-axis direction in FIG. 3). In this case, the engagement protrusion 403 may be supported by the hole 210 so as not to be excessively bent in the movement direction of the pen input device 311. Therefore, damage to the engagement protrusion 403 may be prevented or reduced.

FIGS. 8A, 8B, 8C and 8D are diagrams illustrating example states in which a fixing device 401 is disposed in a recess 501 according to various embodiments.

Figure 8A:
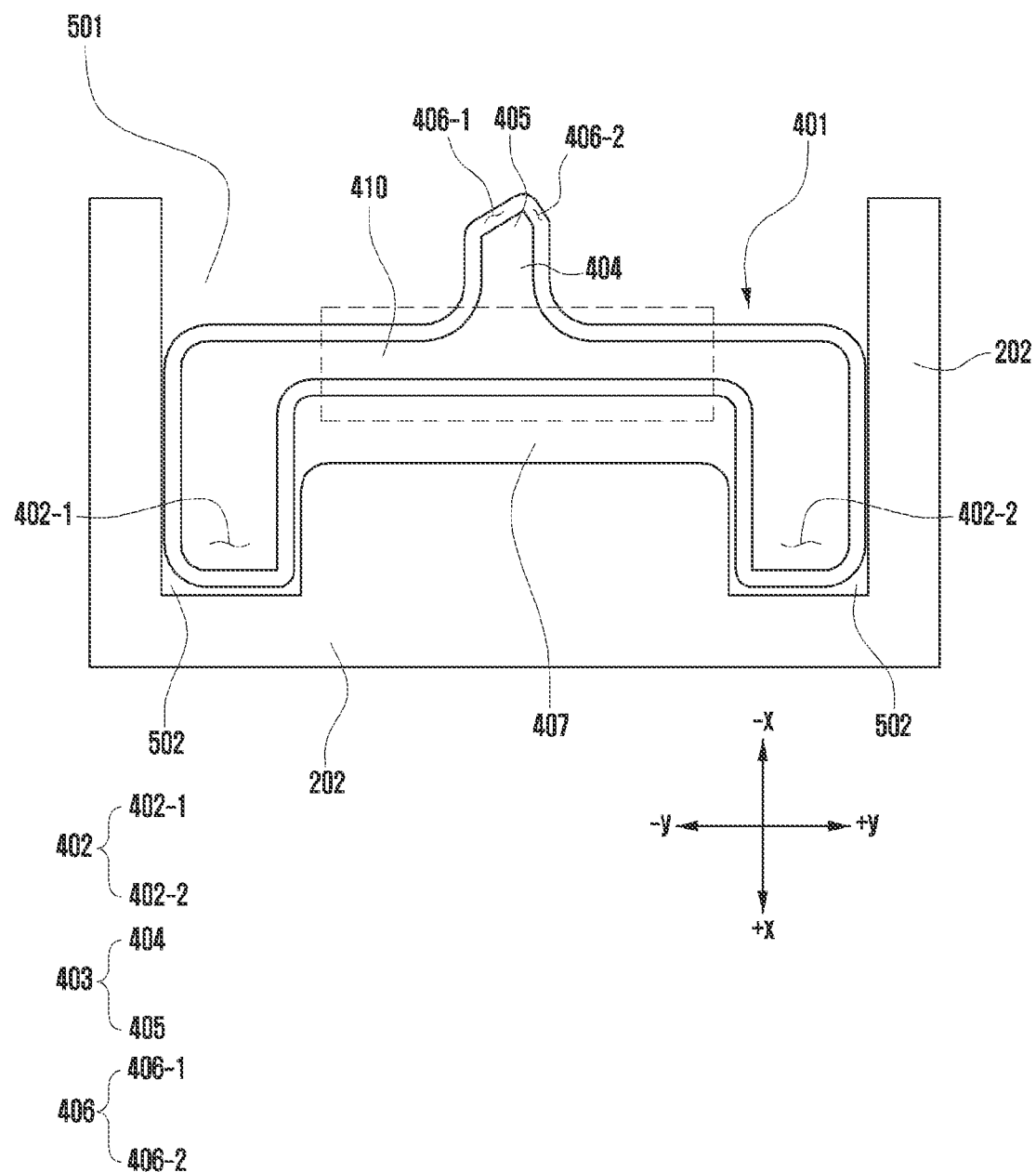
FIGS. 8A, 8B, 8C and 8D are diagrams illustrating states in which a fixing device is disposed in a recess according to various embodiments.
Figure 8B:
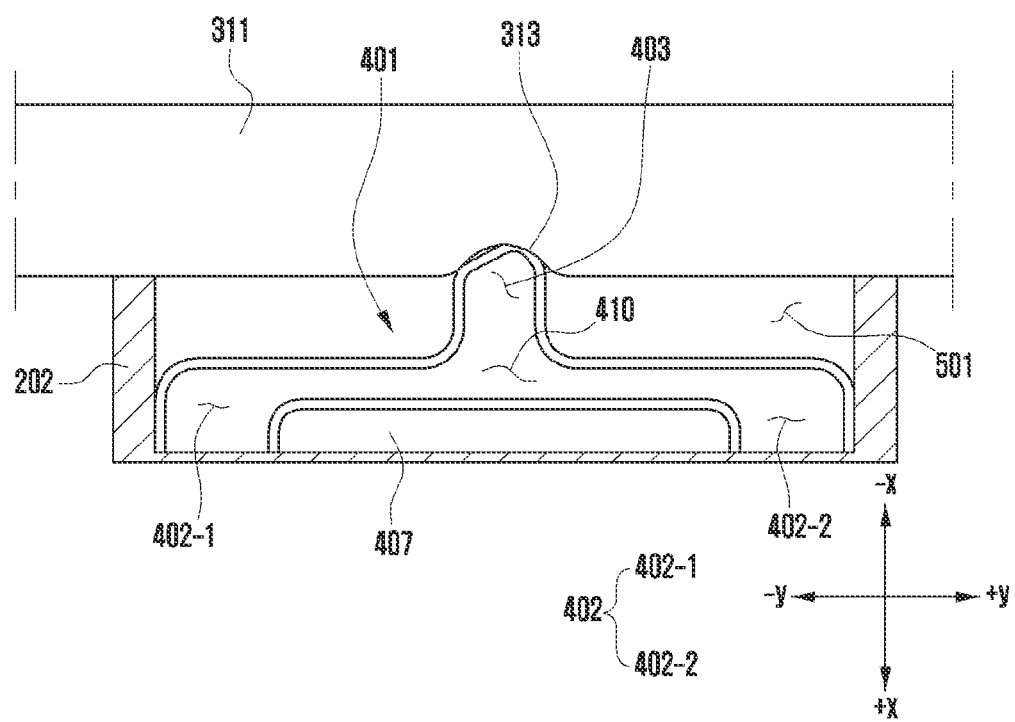
Figure 8C:
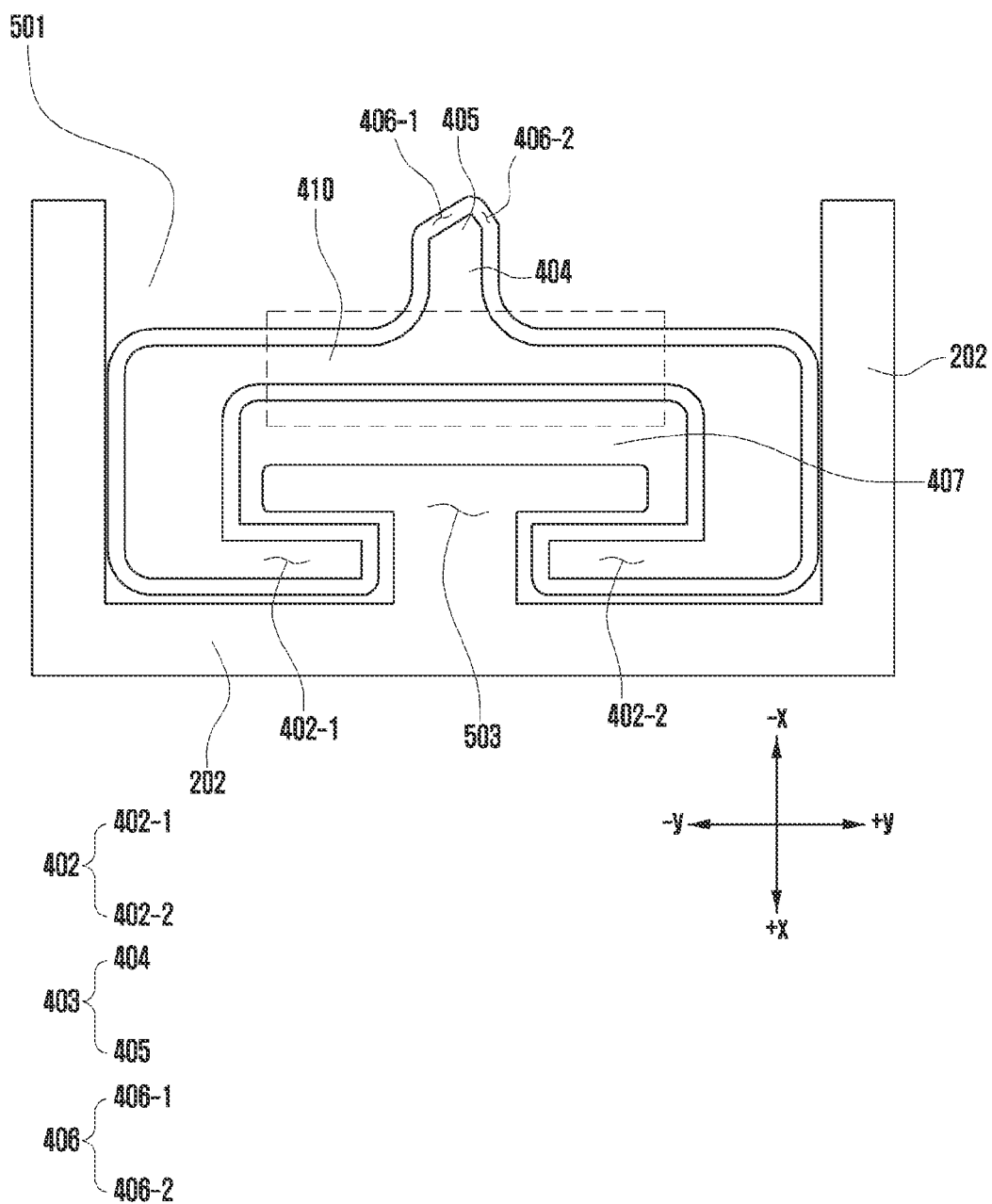
Figure 8D:
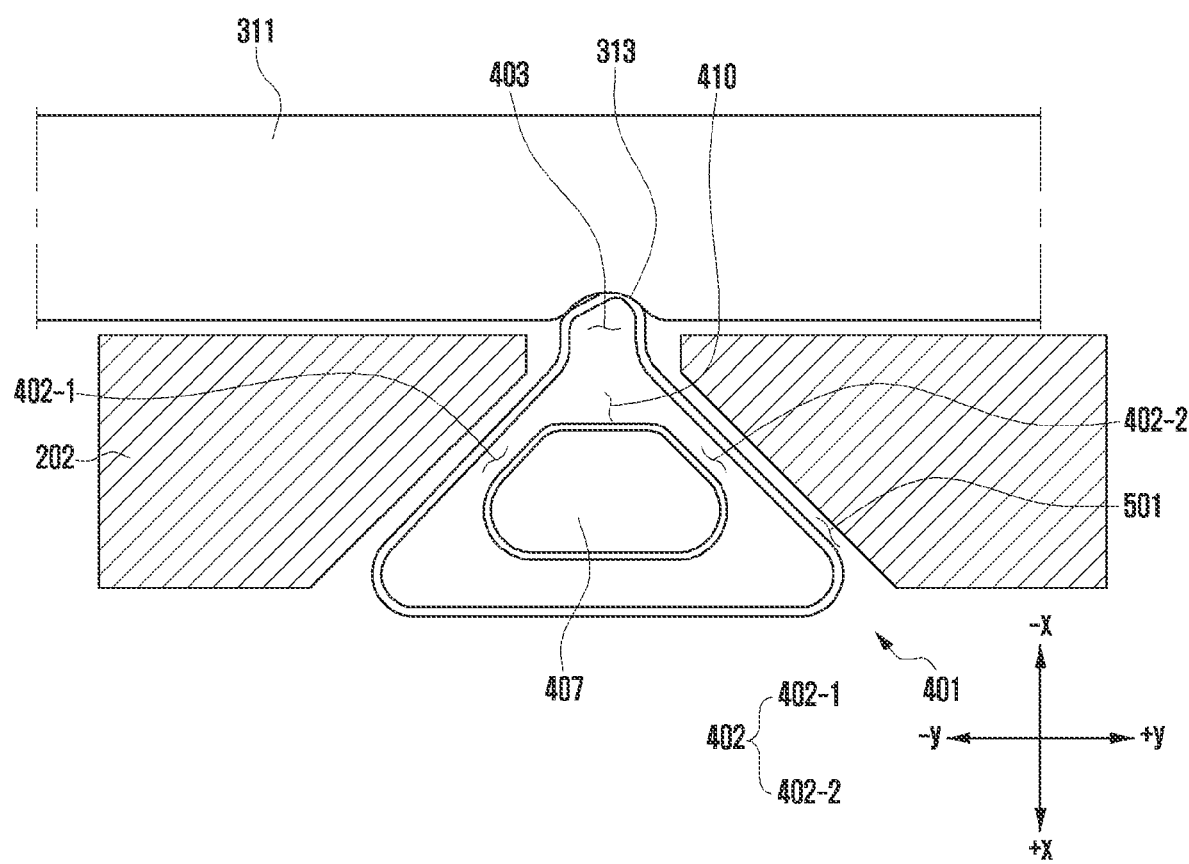

According to various embodiments, the shape of the body 402 of the fixing device 401 may be variously modified. Referring to FIGS. 8A to 8C, at least a portion of the body 402 opposite the deformation portion 410 may be removed.

In an embodiment, referring to FIG. 8A, the opposite portion of the deformation portion 410 may be removed from the body 402. For example, the opposite portion of the deformation portion 410 may have a form in which the first opening 407 extends in one direction (e.g., the +X direction in FIG. 8A). One end 402-1 and the opposite end 402-2 of the body 402, which are connected to the deformation portion 410, may be disposed in the grooves 502 formed in the recess 501, so that the fixing device 401 may be seated on the recess 501. The grooves 502 formed in the recess 501 may be formed to correspond to one end 402-1 and the opposite end 402-2 of the body 402. Accordingly, the body 402 may be fixed to the recess 501 by one end 402-1 and the opposite end 402-2 fit into the grooves 502.

In an embodiment, referring to FIG. 8B, the opposite portion of the deformation portion 410 may be removed from the body 402 as shown in FIG. 8A. For example, the opposite portion of the deformation portion 410 may have a form in which the first opening 407 extends in one direction (e.g., the +X direction in FIG. 8B). The lengths of one end 402-1 and the opposite end 402-2 of the body 402 may be less than those of one end 402-1 and the opposite end 402-2 of the body 402 shown in FIG. 8A in the X-axis direction in FIG. 8B. Accordingly, the length of the recess 501 in which the body 402 is disposed may be reduced in the X-axis direction in FIG. 8B.

In an embodiment, referring to FIG. 8C, a part of the opposite portion of the deformation portion 410 may be removed from the body 402. For example, the opposite portion of the deformation portion 410 may have a form in which the first opening 407 extends in one direction (e.g., the +X direction in FIG. 8C). The recess 501 may have a structure 503 formed in a portion facing the opposite portion of the deformation portion 410. One end 402-1 and the opposite end 402-2 of the opposite portion of the deformation portion 410, which have not been removed, may be coupled to the structure 503 of the recess 501 so that the fixing device 401 may be fixed to the recess 501.

According to various embodiments, the body 402 may be formed in various shapes. In an embodiment, referring to FIG. 8D, the body 402 may be formed in a triangular shape according to the shape of the recess 501. Accordingly, one end 402-1 of the body 402 may correspond to one inclined surface of the housing 202, and the opposite end 402-2 of the body 402 may correspond to the opposite inclined surface of the housing 202. In addition, the body 402 may be formed in various shapes to correspond to the shape of the recess 501.

The fixing devices 401 and the recesses 501 illustrated in FIGS. 8A to 8D described above are merely examples and are not limited to the illustrated shapes. The shapes of the fixing device 401 and the recess 501 may be variously modified within a range capable of being implemented by those skilled in the art. In addition, the fixing devices 401 shown in FIGS. 8A to 8D may have the same or similar configuration and function as the fixing device 401 described in FIGS. 3 to 7 except that a portion of the body 402 is modified.

Although it has been described above that the pen input device 311 is inserted into the electronic device 201 (e.g., the electronic device 101 in FIG. 1), the pen input device 311 may be inserted into a separate accessory (not shown) mounted to the electronic device 201, instead of the electronic device 201.

According to various embodiments, an accessory for protecting the electronic device 201 from external impact may be mounted to the electronic device 201. The accessory may be formed to surround the outer surface of the electronic device 201 to protect the electronic device 201 from external impact. The above-described guide portion 204 in which the pen input device 311 is received may be formed in the accessory. For example, the guide portion 204 may be formed in the accessory so as to extend in the longitudinal direction (e.g., the Y-axis direction in FIG. 2) of the electronic device 201. The recess 501 on which the fixing device 401 is seated may be formed in the accessory to be connected to the guide portion 204. As the pen input device 311 is inserted into the guide portion 204 formed in the accessory, the engagement protrusion 403 of the fixing device 401 may engage with the engagement groove 313 formed in the pen input device 311. Accordingly, the pen input device 311 may be fixed into the guide portion 204. In summary, the pen input device 311 may move inside the guide portion 204 formed in the accessory or may be fixed into the guide portion 204 through the movement of the engagement protrusion 403 and the deformation portion 410 described with reference to FIGS. 6B and 6C.

Hereinafter, another example fixing device 700 will be described. Descriptions of the same or similar configurations as those of the fixing device 401 described above may not be repeated.

Figure 9B:
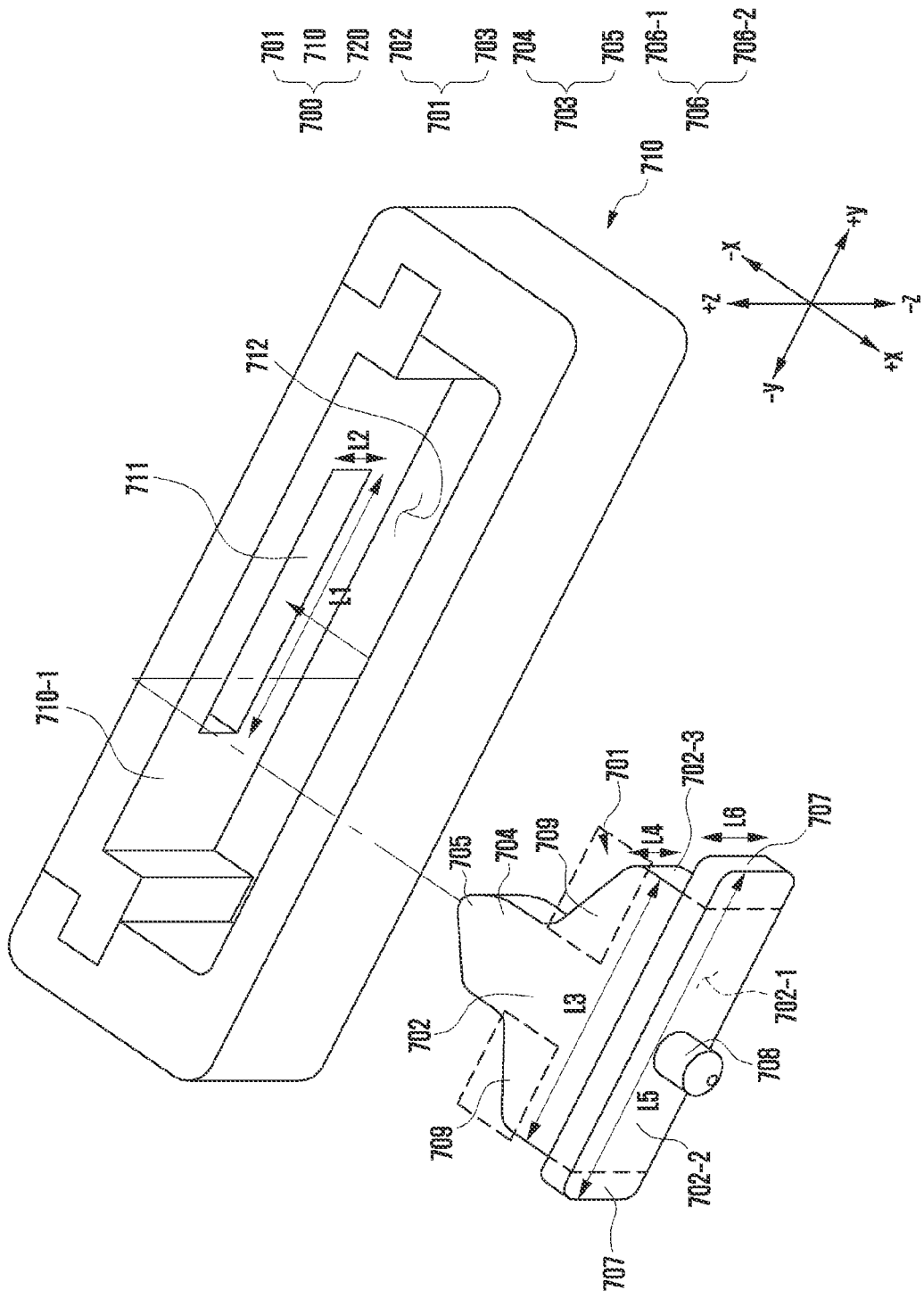
FIG. 9B is an exploded perspective view of a fixing member and a bracket of a fixing device according to various embodiments.
Figure 9C:
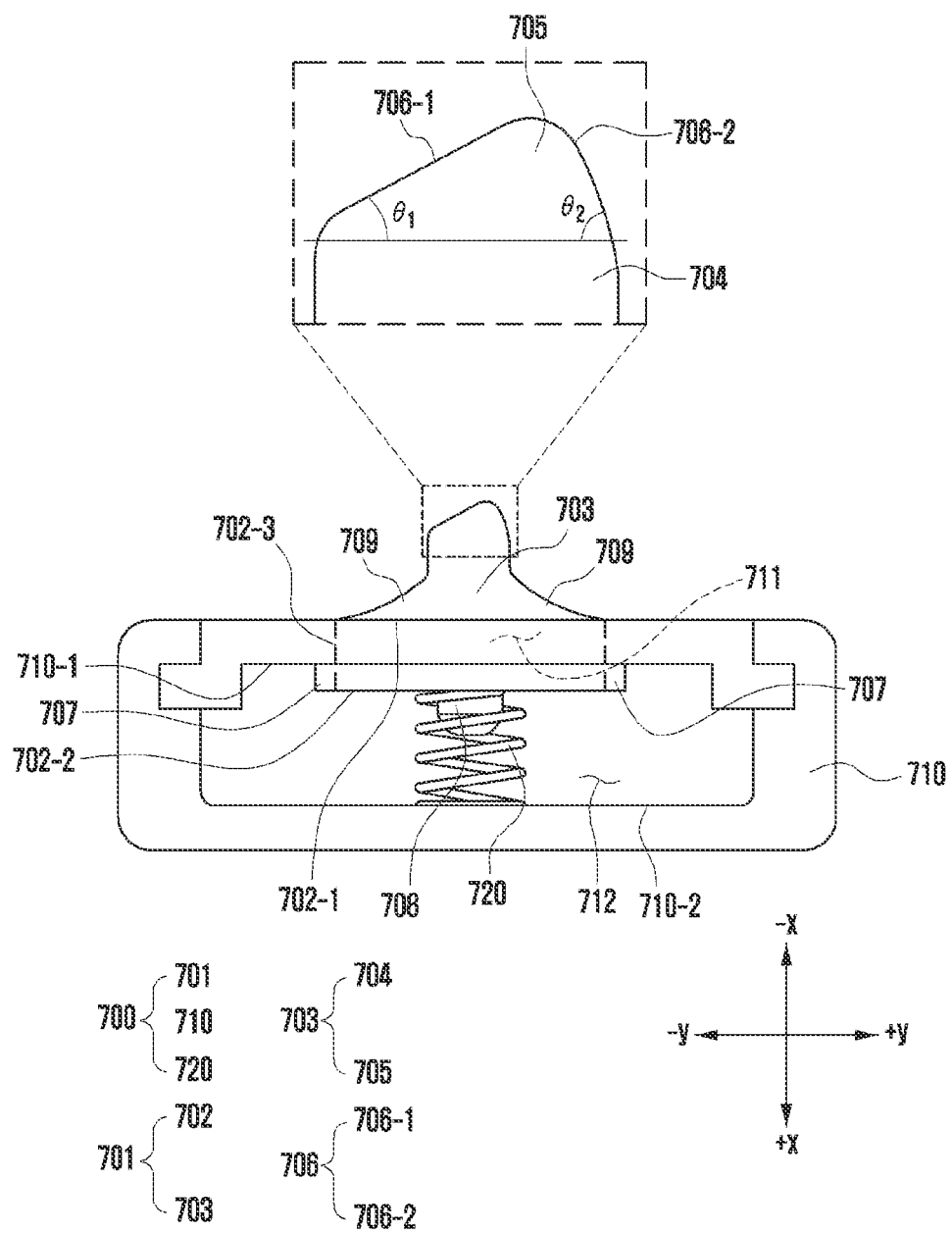
FIG. 9C is a diagram including an enlarged view of an engagement protrusion of a fixing device according to various embodiments.
Figure 10A:
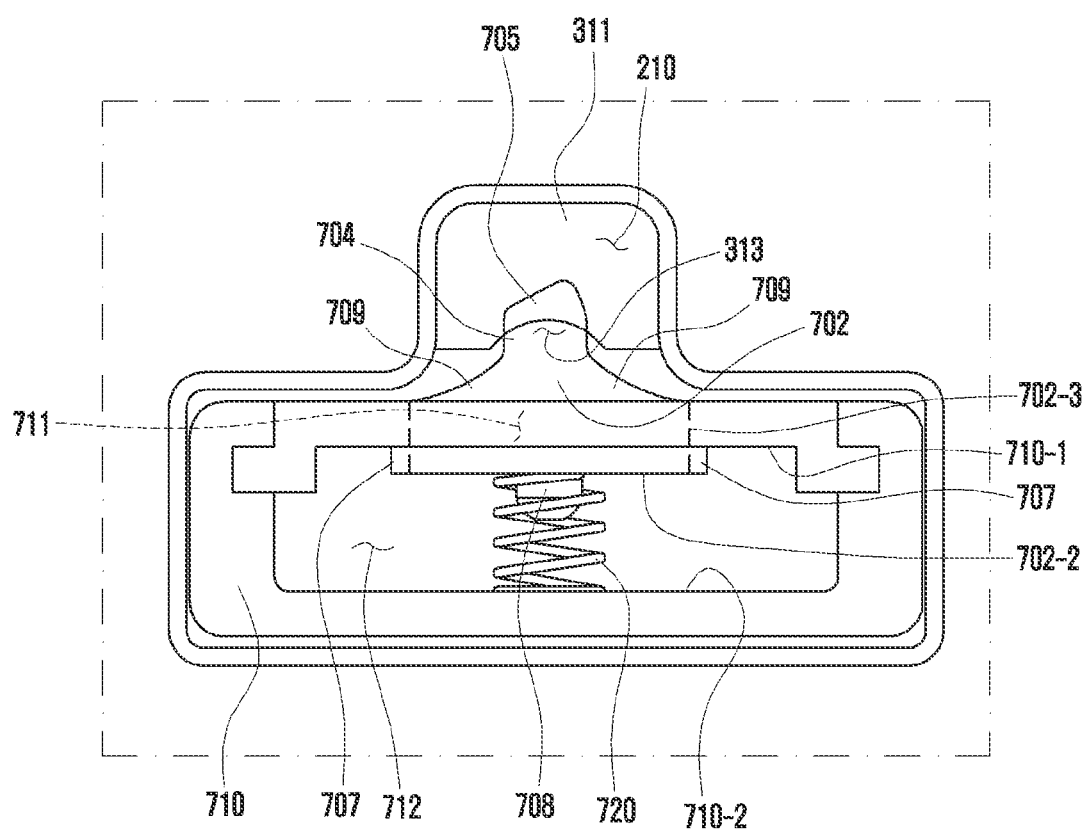
FIG. 10A is a diagram illustrating a state in which a fixing device is disposed in a recess formed in a housing and engages with a pen input device according to various embodiments.
Figure 10A:
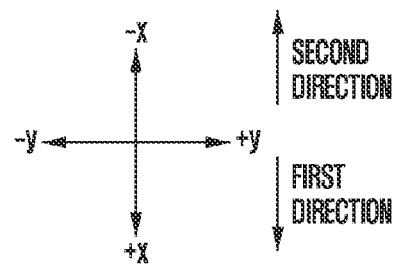
Figure 10B:
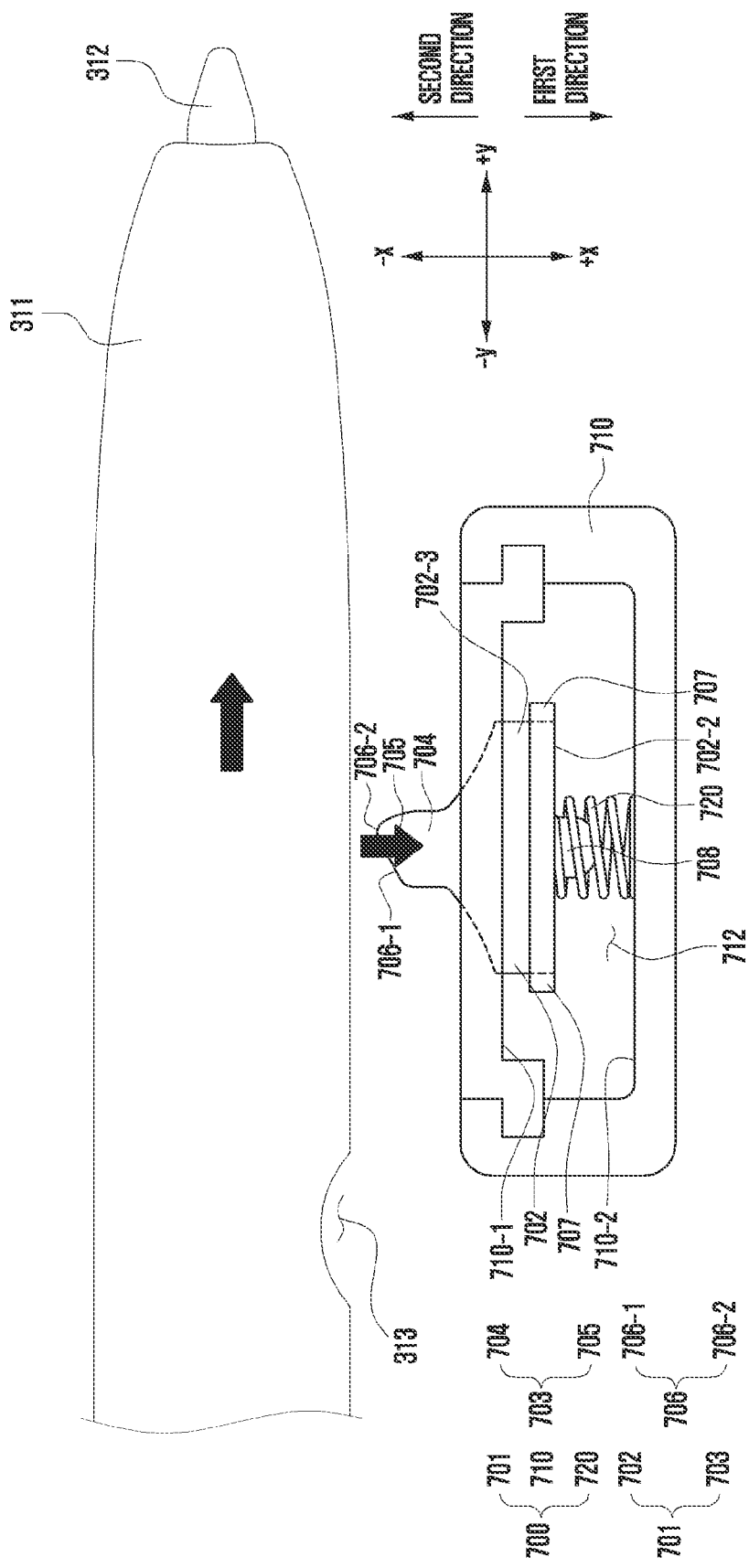
FIG. 10B is a diagram illustrating a state in which a fixing member of a fixing device retreats from a bracket when a pen input device is inserted into a guide portion of an electronic device according to various embodiments.
Figure 10C:
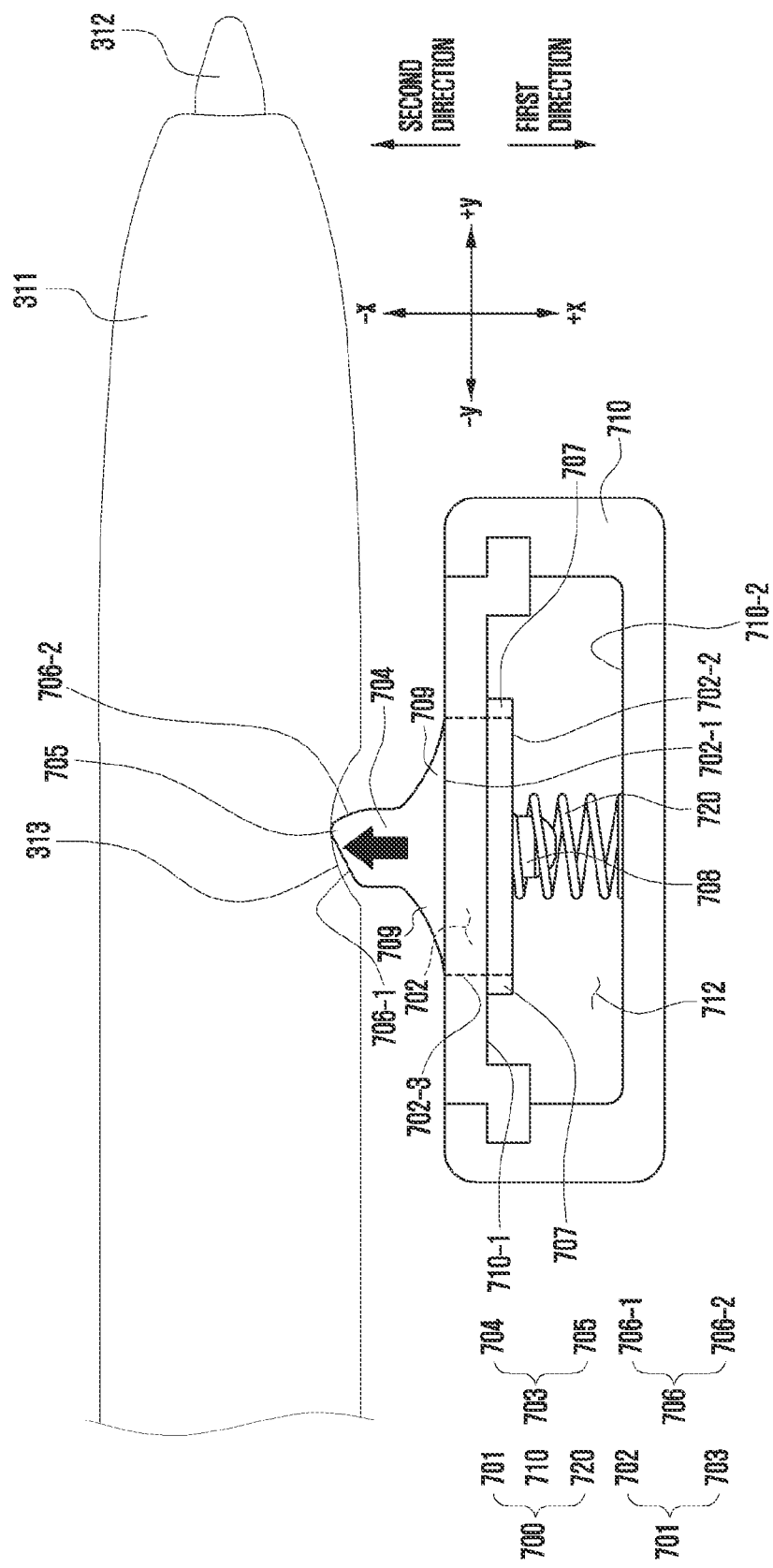
FIG. 10C is a diagram illustrating a state in which an engagement protrusion of a fixing member engages with a groove of a pen input device as insertion of the pen input device into a guide portion of an electronic device is completed according to various embodiments.
Figure 11A:
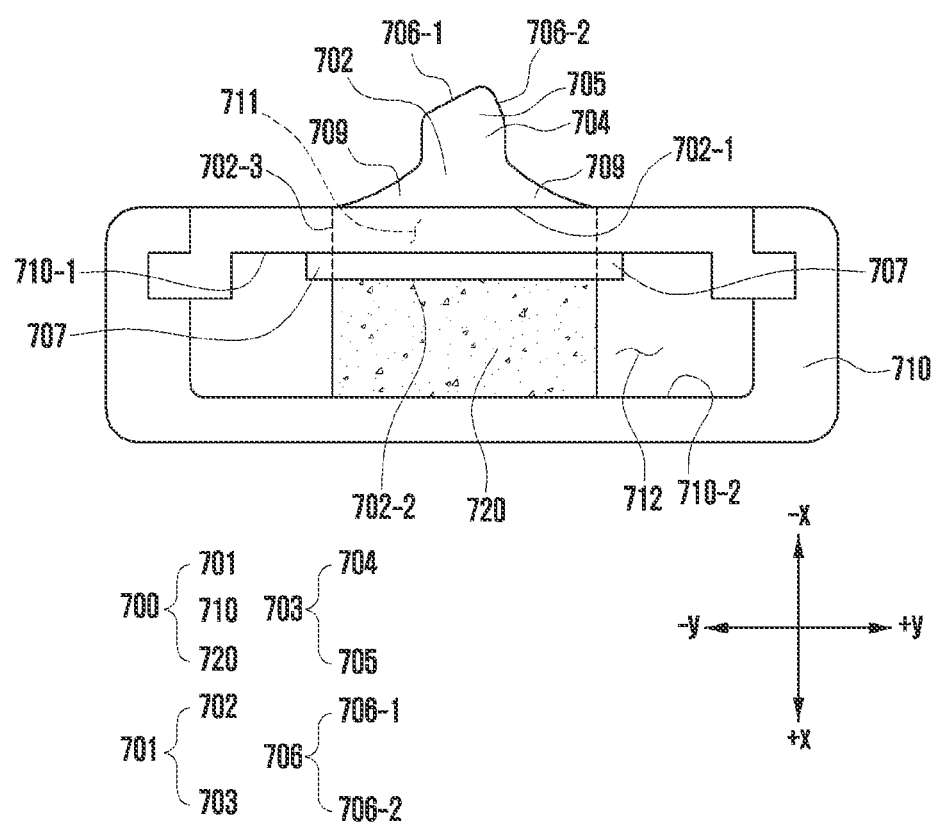
FIGS. 11A, 11B, 11C and 11D are diagrams illustrating various examples of an elastic member disposed in a fixing device according to various embodiments.
Figure 11B:
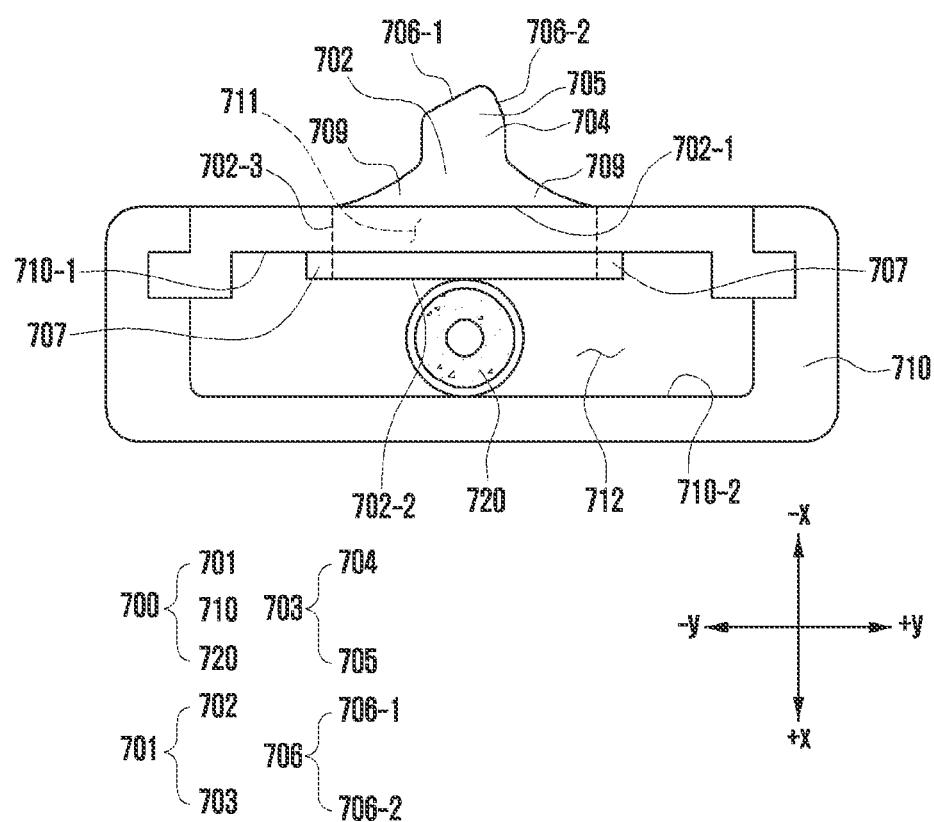
Figure 11C:
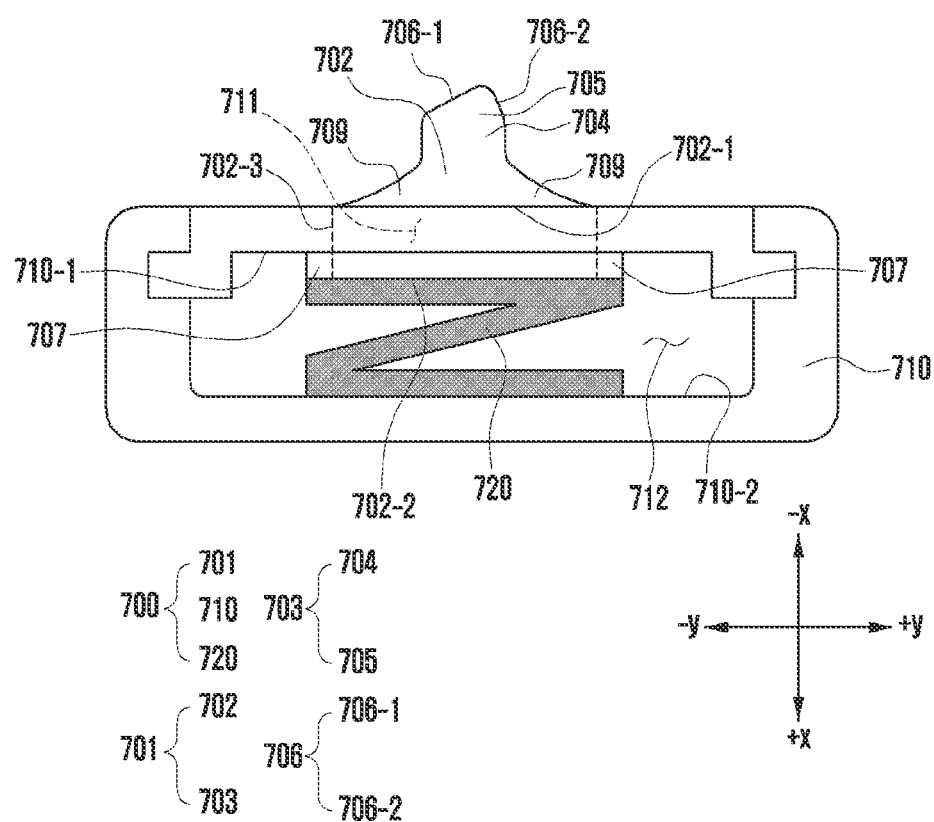
Figure 11D:
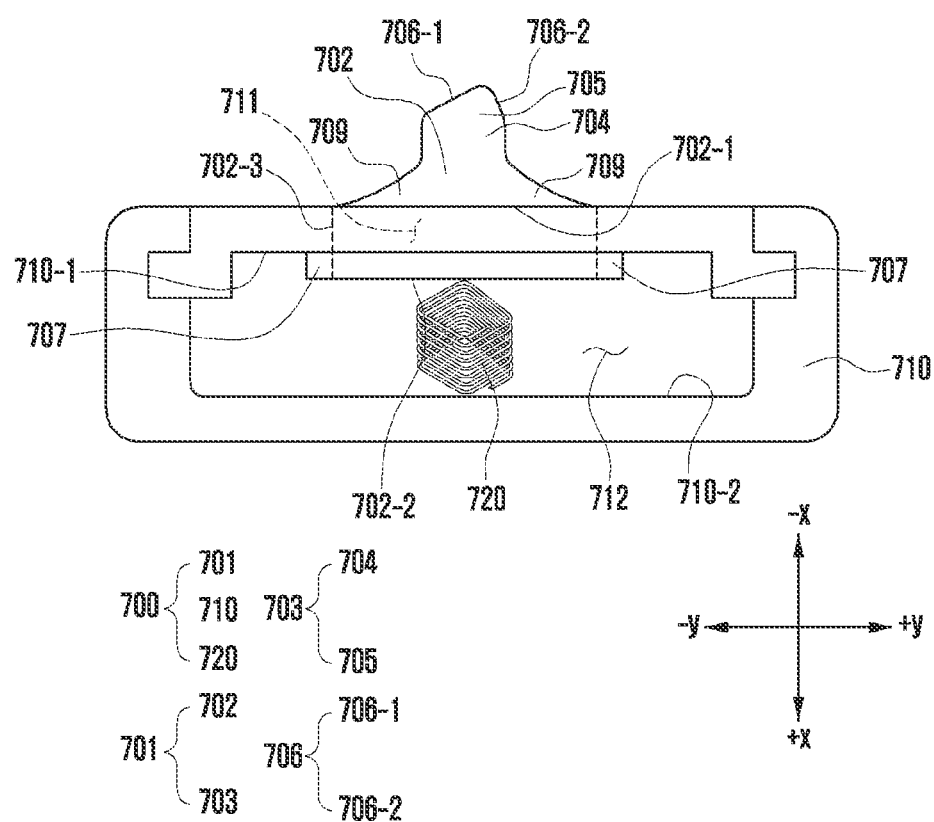

FIG. 9A is a perspective view illustrating an example fixing device 700 according to various embodiments. FIG. 9B is an exploded perspective view illustrating the fixing member 701 and a bracket 710 of a fixing device 700 according to various embodiments. FIG. 9C is a diagram including an enlarged view of an engagement protrusion 703 of a fixing device 700 according to various embodiments. FIG. 10A is a diagram illustrating a state in which a fixing device 700 is disposed in a recess 501 formed in a housing 202 and engages with a pen input device 311 according to various embodiments. FIG. 10B is a diagram illustrating a state in which a fixing member 701 of a fixing device 700 retreats from a bracket 710 when a pen input device 311 is inserted into a guide portion 204 of an electronic device according to various embodiments. FIG. 10C is a diagram illustrating a state in which an engagement protrusion 703 of a fixing member 701 engages with a groove of a pen input device 311 as insertion of the pen input device 311 into a guide portion 204 of an electronic device is completed according to various embodiments. FIGS. 11A, 11B, 11C and 11D are diagrams illustrating various examples of an elastic member 720 disposed in a fixing device 700 according to various embodiments.

According to various embodiments, a fixing device 700 (e.g., the fixing device 700 in FIG. 9A) for fixing a pen input device 311 (e.g., the pen input device 311 in FIG. 2) to a guide portion 204 (e.g., the guide portion 204 in FIG. 2) may be configured in various embodiments. Referring to FIG. 9A, the fixing device 700 may include a fixing member 701, a bracket 710 accommodating a portion of the fixing member 701, and an elastic member 720 that is disposed between the fixing member 701 and the bracket 710 so as to support one surface of the fixing member 701 such that the fixing member 701 is able to move relative to the bracket 710. Hereinafter, a detailed configuration of the fixing member 701, the bracket 710, and the elastic member 720 included in the fixing device 700 will be described.

According to various embodiments, as shown in FIG. 9A, the fixing member 701 of the fixing device 700 may include a body 702 and an engagement protrusion 703 formed to protrude from the body 702. Here, the body 702 may indicate a body of the fixing member 701. The engagement protrusion 703 may indicate a portion that protrudes from a first surface 702-1 of the body 702 and at least part of which is disposed in the guide portion 204 so as to engage with the engagement groove 313 of the pen input device 311.

According to various embodiments, at least a portion of the fixing member 701 may be disposed in a recess 501 formed in the housing 202 to be adjacent to the guide portion 204. In an embodiment, the body 702 of the fixing member 701 may be disposed in a recess 501 formed in the housing 202 to be positioned adjacent to the guide portion 204. For example, referring to FIG. 9A, the body 702 of the fixing member 701 may be accommodated in the bracket 710 of the fixing device 700. The bracket 710 may be disposed in the recess 501 of the housing 202 to be positioned adjacent to the guide portion 204. Accordingly, the body 702 may be accommodated in the bracket 710 to be disposed in the recess 501 adjacent to the guide portion 204. In an embodiment, the engagement protrusion 703 may protrude from a first surface 702-1 of the body 702 so that at least a portion thereof may be disposed in the guide portion 204. For example, referring to FIG. 10A, which will be described later, the fixing member 701 may be disposed in the bracket 710 such that the engagement protrusion 703 passes through a second opening 711 formed on the first surface 710-1 of the bracket 710. The engagement protrusion 703 may pass through the second opening 711 of the bracket 710 to be disposed in the guide portion 204 through a hole 210 connecting the recess 501 and the guide portion 204.

According to various embodiments, the fixing member 701 may be formed in various shapes.

In an embodiment, the body 702 may be formed to have a width greater than that of the engagement protrusion 703. For example, the width of the body 702 in the transverse direction (e.g., the width in the Y-axis direction in FIG. 9B) may be greater than the width in the transverse direction of the engagement protrusion 703 (e.g., the width in the Y-axis direction in FIG. 9B). In an embodiment, the width of the body 702 in the longitudinal direction (e.g., the width in the X-axis direction in FIG. 9B) may be greater than the width of the engagement protrusion 703 in the longitudinal direction (e.g., the width in the X-axis direction in FIG. 9B).

According to various embodiments, the engagement protrusion 703 may be formed to protrude from the center of the body 702. For example, the body 702 may be formed symmetrically with respect to the engagement protrusion 703. In an embodiment, since the engagement protrusion 703 of the fixing device 700 is formed to protrude from the center of the body 702, the engagement protrusion 703 may have a more stable structure than the engagement protrusion that is formed to be eccentric from the center of the body 702. In addition, the body 702 may provide the same support force to the engagement protrusion 703 on the left side (e.g., the −Y direction in FIG. 9A) and right side (e.g., the +Y direction in FIG. 9A) of the engagement protrusion 703, based on the engagement protrusion 703. Therefore, unlike the fixing device 301 of the comparative example shown in FIG. 4, even if insertion or removal of the pen input device 311 is repeated in the fixing device 700 of the disclosure, plastic deformation due to an external force applied to the engagement protrusion 703 in contact with the pen input device 311 may be relieved or eliminated.

According to various embodiments, as shown in FIGS. 9A and 9B, the engagement protrusion 703 of the fixing member 701 may include a protrusion portion 704 and an engagement portion 705. The protrusion portion 704 may refer to a portion that protrude from a first surface 702-1 of the body 702, and may refer to the body of the engagement protrusion 703. The engagement portion 705 is a portion that protrudes from the end of the protrusion portion 704, and may be inserted into the engagement groove 313 of the pen input device 311. Accordingly, the engagement portion 705 of the engagement protrusion 703 may engage with the engagement groove 313 of the pen input device 311 so that the pen input device 311 may be fixed to the guide portion 204 of the housing 202.

In an embodiment, the engagement portion 705 may be formed to have different inclinations with respect to the protrusion portion 704. Referring to FIG. 9C, the engagement portion 705 may include inclines 706. The inclines 706 may include a first incline 706-1 and a second incline 706-2. The first incline 706-1 may be a portion that comes into contact with one surface of the pen input device 311 when the pen input device 311 is inserted into the guide portion 204 of the housing 202. The second incline 706-2 may be a portion that comes into contact with one surface of the pen input device 311 when the pen input device 311 is removed from the guide portion 204 of the housing 202.

In an embodiment, the inclination between the first incline 706-1 and the protrusion portion 704 may be less than the inclination between the second incline 706-2 and the protrusion portion 704. For example, the angle θ1 between the first incline 706-1 and the protrusion portion 704 may be smaller than the angle θ2 between the second incline 706-2 and the protrusion portion 704. In various embodiments, the angle θ1 between the first incline 706-1 and the protrusion portion 704 or the angle θ2 between the second incline 706-2 and the protrusion portion 704 may be an acute angle. In an embodiment, the angle θ1 between the first incline 706-1 and the protrusion portion 704 may be an acute angle, and the angle θ2 between the second incline 746-2 and the protrusion portion 704 may be an obtuse angle.

In an embodiment, the engagement portion 705 may be formed such that the inclination between the first incline 706-1 and the protrusion portion 704 is gentle. Therefore, the pen input device 311 may be easily inserted into the guide portion 204. In addition, the engagement portion 705 may be formed such that the inclination between the second incline 706-2 and the protrusion portion 704 is greater than the inclination between the first incline 706-1 and the protrusion portion 704. Accordingly, it is possible to prevent the pen input device 311 from easily escaping from the guide portion 204.

According to various embodiments, the fixing device 700 may include a bracket 710 disposed in a recess 501 formed at a position adjacent to the guide portion 204. As described above, a portion of the fixing member 701 may be accommodated in the bracket 710. For example, referring to FIG. 9B, a receiving space 712 may be formed in the bracket 710 to accommodate the fixing member 701. The receiving space 712 is a space formed in the center of the bracket 710 and may be formed to have a size capable of accommodating the fixing member 701. In an embodiment, the body 702 of the fixing member 701 may be received in the receiving space 712. In an embodiment, the receiving space 712 may be a space in which the fixing member 701 may move relative to the bracket 710. For example, the receiving space 712 may be a space formed to enable the fixing member 701 to move relative to the bracket 710 by the elastic member 720 supporting the body 702 when the pen input device 311 is inserted into the guide portion 204 or removed from the guide portion 204. The operation of the fixing member 701 moving relative to the bracket 710 in the receiving space 712 of the bracket 710 is as follows.

Referring to FIGS. 10A, 10B and 10C to be described later, the engagement protrusion 703 of the fixing member 701 may come into contact with one surface of the pen input device 311 when the pen input device 311 is inserted into or removed from the guide portion 204. Accordingly, the fixing member 701 may retreat from the bracket 710 through the contact with the pen input device 311. For example, as the engagement protrusion 703 comes into contact with the pen input device 311, an external force may be applied to the fixing member 701 in a first direction (e.g., the +X direction in FIG. 10B). Therefore, the fixing member 701 may move in the first direction with respect to the bracket 710. In this case, the elastic member 720 disposed in the receiving space 712 of the bracket 710 to support a second surface 702-2 opposite the first surface 702-1 of the body 702 may be compressed by the fixing member 701 in the first direction as the fixing member 701 moves in the first direction. Then, when the pen input device 311 is completely inserted into the guide portion 204, the engagement protrusion 703, which has moved in the first direction, may move in a second direction (e.g., the −X direction in FIG. 10B) with respect to the bracket 710 by the elastic force of the elastic member 720 to be inserted into the engagement groove 313 of the pen input device 311. Accordingly, the elastic member 720, which was compressed in the first direction, may be restored to its original shape by the elastic force.

According to various embodiments, as described above, a second opening 711 into which the engagement protrusion 703 of the fixing member 701 is inserted may be formed on one surface of the bracket 710. In an embodiment, referring to FIG. 9B, the second opening 711 may be formed on the first surface 710-1 of the bracket 710. In an embodiment, referring to FIG. 10A, the bracket 710 may be disposed in the recess 501 such that the second opening 711 is connected to the hole 210 connecting the recess 501 and the guide portion 204. The fixing member 701 may be disposed in the receiving space 712 of the bracket 710 such that the engagement protrusion 703 passes through the second opening 711. Thus, the engagement protrusion 703 may pass through the second opening 711 and the hole 210 in sequence so that at least a portion thereof may be disposed in the guide portion 204.

According to various embodiments, the second opening 711 formed in the bracket 710 may guide the movement of the fixing member 701 with respect to the bracket 710. In an embodiment, the second opening 711 may be formed in a shape corresponding to the body 702 of the fixing member 701. For example, referring to FIG. 9B, the horizontal length L1 and the vertical length L2 of the second opening 711 may correspond to the horizontal length L3 and the vertical length L4 of the body 702. In an embodiment, the second opening 711 may be formed to have a shape corresponding to the body 702 of the fixing member 701. Accordingly, the fixing member 701 may be guided by the second opening 711 to move in the first direction and in the second direction with respect to the bracket 710 during the insertion and removal of the pen input device 311.

According to various embodiments, at least a portion of the body 702 of the fixing member 701 may be disposed in the second opening 711 of the bracket 710. In an embodiment, as the engagement protrusion 703 comes into contact with one surface of the pen input device 311, the fixing member 701 may move in the first direction with respect to the bracket 710. In this case, one outermost end of the body 702 positioned in the +Y direction in FIG. 9B and the opposite outermost end of the body 702 positioned in the −Y direction in FIG. 9B may be positioned in the second opening 711. In addition, in an embodiment, when the insertion of the pen input device 311 into the guide portion 204 is completed, the fixing member 701 may move in the second direction by the elastic force of the elastic member 720. In this case, one outermost end and the opposite outermost end of the body 702 may be positioned in the second opening 711. In an embodiment, at least a portion of the body 702 of the fixing member 701 may be disposed in the second opening 711 of the bracket 710 regardless of the insertion and removal of the pen input device 311. The fixing member 701 may be guided by the second opening 711 to move in the first direction and in the second direction with respect to the bracket 710 during the insertion and removal of the pen input device 311.

According to various embodiments, the fixing device 700 may include an elastic member (e.g., a part that provides an elastic force, including, for example, and without limitation, a spring or elastic material) 720 that is disposed between the fixing member 701 and the bracket 710 to support one surface of the fixing member 701 such that the fixing member 701 is able to move relative to the bracket 710. In an embodiment, referring to FIG. 10A, the elastic member 720 may be disposed in the receiving space 712 of the bracket 710 so as to support the second surface 702-2 opposite the first surface 702-1 of the body 702. In an embodiment, referring to FIG. 10A, the elastic member 720 may come into contact with the second surface 710-2 opposite the first surface 710-1 of the bracket 710 so as to support the second surface 702-2 of the body 702. In an embodiment, the elastic member 720 may repeat compression or restoration in response to the movement of the fixing member 701. For example, when the fixing member 701 comes into contact with one surface of the pen input device 311 to move in the first direction (e.g., the +X direction in FIG. 10B) in the process in which the pen input device 311 is inserted into or removed from the guide portion 204, the elastic member 720 may be compressed in the first direction by the body 702. In addition, when the insertion of the pen input device 311 into the guide portion 204 is completed, the fixing member 701 may move in the second direction to engage with the engagement groove 313 of the pen input device 311. Accordingly, the elastic member 720 may move in the second direction by the elastic force to be restored to the shape before being compressed.

In an embodiment, the fixing device 700 may include a fixing member 701, a bracket 710, and an elastic member 720 in contact with the fixing member 701 and the bracket 710. The fixing member 701 may move in the first direction (e.g., the +X direction in FIG. 10B) or in the second direction (e.g., the −X direction in FIG. 10C) by the elastic member 720 when the pen input device 311 is inserted into or removed from the guide portion 204. The pen input device 311 may be inserted into the guide portion 204 to be fixed into the guide portion 204 and may be removed from the guide portion by the movement of the fixing member 701.

According to various embodiments, the fixing member 701 may include a protrusion 708 that is inserted into the elastic member 720. In an embodiment, referring to FIG. 10A, a protrusion 708 may be formed to protrude from the second surface 702-2 of the body 702. The protrusion 708 may guide the elastic member 720 to support the body 702. In an embodiment, in the case where the elastic member 720 is configured in the form of a spring, the protrusion 708 may be inserted into the center of the spring coils. Accordingly, the elastic member 720 may support the second surface 702-2 of the body 702 by the protrusion 708 even if the fixing member 701 repeatedly moves in the first direction or the second direction with respect to the bracket 710 in response to the movement of the pen input device 311.

According to an embodiment, the fixing member 701 may fix or remove the pen input device 311 to or from the guide portion 204 through the following operation. The engagement protrusion 703 of the fixing member 701 may come into contact with the pen input device 311 while the pen input device 311 is inserted or removed. Referring to FIG. 10B, the engagement protrusion 703 may come into contact with one surface of the pen input device 311 when the pen input device 311 moves inside the guide portion 204, so that an external force may be applied to the engagement protrusion 703 in the first direction (e.g., the +X direction in FIG. 10B). Thus, the fixing member 701 may move in the first direction with respect to the bracket 710, and the elastic member 720 supporting the second surface 702-2 of the body 702 of the fixing member 701 may be compressed in the first direction. Referring to FIG. 10C, when the pen input device 311 is completely inserted into the guide portion 204, the engagement protrusion 703 may engage with the engagement groove 313 formed in the pen input device 311 to be fixed in the electronic device. As the engagement portion 705 of the engagement protrusion 703 engages with the engagement groove 313 of the pen input device 311, the fixing member 701 may move in the second direction (e.g., the −X direction in FIG. 10C) by the elastic force of the elastic member 720. The pen input device 311 may be removed from the guide portion 204 or may be fixed into the guide portion 204 through the movement of the fixing member 701 and the elastic member 720 described above.

According to various embodiments, the fixing member 701 may include a separation prevention portion 707 formed greater than the width of the second opening 711 formed in the bracket 710. The separation prevention portion 707 may be formed on one surface of the body 702 so as to prevent the fixing member, disposed in the receiving space 712 of the bracket 710, from escaping through the second opening 711 formed in the bracket 710. In an embodiment, the separation prevention portion 707 may be formed to protrude from the side surface 702-3 surrounding the first surface 702-1 and the second surface 702-2 of the body 702. Referring to FIG. 9B, the separation prevention portion 707 may have a horizontal length L5 that is greater than the horizontal length L1 of the second opening 711 of the bracket 710. In addition, the separation prevention portion 707 may have a vertical length L6 that is greater than the vertical length L2 of the second opening 711 of the bracket 710. In an embodiment, since the separation prevention portion 707 is formed on the fixing member 701, it is possible to prevent the fixing member 701 from escaping through the second opening 711 formed in the bracket 710 to the outside of the bracket 710.

According to various embodiments, as shown in FIGS. 9A to 11D, the fixing member 701 may include reinforcement portions 709. The reinforcement portions 709 may be formed between the engagement protrusion 703 and one surface of the body 702. For example, the reinforcement portions 709 may be formed between the protrusion portion 704 of the engagement protrusion 703 and the body 702 to support the protrusion portion 704 of the engagement protrusion 703. The reinforcement portions 709 may be formed in various shapes between the engagement protrusion 703 and the body 702. In an embodiment, the reinforcement portions 709 may be formed symmetrically with respect to the protrusion portion 704. In an embodiment, the reinforcement portions 709 may be formed asymmetrically with respect to the protrusion portion 704.

In various example embodiments, the reinforcement portions 709 may support the engagement protrusion 703. The reinforcement portions 709 may support the engagement protrusion 703 when the pen input device 311 is inserted into the guide portion 204 or removed from the guide portion 204 to lower the stress concentration applied to the engagement protrusion 703. Therefore, plastic deformation that may occur in the engagement protrusion 703 due to contact with the pen input device 311 may be relieved or eliminated by the reinforcement portions 709.

According to various embodiments, the fixing member 701 may be formed of various materials. For example, the fixing member 701 may be formed of an elastic material such as rubber, silicone, and urethane. In an embodiment, since the fixing member 701 is formed of an elastic material, plastic deformation that may be caused by contact with one surface of the pen input device 311 may be prevented.

According to various embodiments, the bracket 710 may be formed of various materials. For example, it may be formed of a metal material and/or a non-metal material. The metal material may include, for example, and without limitation, alloys of aluminum, stainless steel (STS, SUS), iron, magnesium, titanium, etc., and the non-metal material may include, for example, and without limitation, a synthetic resin, ceramic, or engineering plastic. The bracket 710 may be formed in various shapes. In an embodiment, the bracket 710 may be formed to have an integral shape by injection or die-casting. In an embodiment, the bracket 710 may be configured to be assembled so that the fixing member 701 may be easily received in the receiving space 712.

According to various embodiments, the elastic member 720 may be formed of various materials. In an embodiment, the elastic member 720 may be a spring formed of a metal and/or non-metal material, or may be formed of an elastic material such as natural rubber and synthetic rubber.

According to various embodiments, the elastic member 720 may be formed in various shapes. In an embodiment, referring to FIG. 9A, the elastic member 720 may be configured in the form of a spring in which wires are wound several times. In an embodiment, referring to FIGS. 11A and 11B, the elastic member 720 may be formed of an elastic material in a hexahedral or cylindrical shape to support the second surface 702-2 of the body 702, thereby supporting the second surface 702-2 of the body 702 in the receiving space 712 of the bracket 710. In an embodiment, referring to FIG. 11C, the elastic member 720 may be configured in the form of a leaf spring, thereby supporting the second surface 702-2 of the body 702 in the receiving space 712 of the bracket 710. In an embodiment, referring to FIG. 11D, the elastic member 720 may be configured in the form of a square spring in which wires are wound several times, thereby supporting the second surface 702-2 of the body 702 in the receiving space 712 of the bracket 710.

The body 702, the engagement protrusion 703, the protrusion portion 704, the engagement portion 705, the reinforcement and separation prevention portion 707, which are elements of the fixing member 701 described above, are merely distinguished to explain the roles of respective parts of the fixing member 701, and they may not be actually distinguished in the fixing device 700. In an embodiment, the body 702, the engagement protrusion 703, the protrusion portion 704, the engagement portion 705, the reinforcement portion 709, and the separation prevention portion 707 may be integrally formed to comprise the fixing member 701.

In addition, the shapes of the fixing member 701 described above are only examples, and the fixing member 701 is not limited to the shapes shown in FIGS. 9A to 11D. Similarly, the bracket 710 is not limited to the shapes shown in FIGS. 9A to 11D.

In the above description, although the fixing member 701 has been described only as being inserted into the bracket 710, according to various embodiments, the fixing member 701 may be disposed directly in the recess 501 formed in the housing 202, instead of being inserted into the bracket 710.

In an embodiment, the fixing device 700 may be configured as the fixing member 701 and the elastic member 720. For example, the fixing member 701 may be disposed in the recess 501 such that the engagement protrusion 703 passes through the hole 210 formed in the housing 202 to be disposed in the guide portion 204, and the elastic member 720 may be disposed in the recess 501 to support the second surface 702-2 of the body 702 of the fixing member 701. When the pen input device 311 is inserted into the guide portion 204, the fixing member 701 may receive an external force in the first direction as one surface of the pen input device 311 comes into contact with the engagement protrusion 703, thereby moving in the first direction. Accordingly, the elastic member 720 supporting the second surface 702-2 of the body 702 of the fixing member 701 may be compressed. In addition, when the pen input device 311 is completely inserted into the guide portion 204, the engagement protrusion 703 of the fixing member 701 may engage with the engagement groove 313 formed in the pen input device 311. Accordingly, the body 702 may move in the second direction by the elastic force of the elastic member 720, and the elastic member 720 may be restored to the shape before being compressed. The pen input device 311 may be fixed into the guide portion 204 through the movement of the fixing member 701 described above.

An electronic device (e.g., the electronic device 101 in FIG. 1) according to various example embodiments may include: a housing, a guide portion formed in the housing having a shape corresponding to a pen input device to accommodate the pen input device, a body disposed in the housing adjacent to the guide, an engagement protrusion including a protrusion portion protruding from one surface of the body wherein at least a portion of the protrusion portion is disposed inside the guide and an engagement portion formed at an end of the protrusion portion, and an opening (e.g., the first opening 407 in FIG. 5A) formed in the body wherein the engagement protrusion is configured to move relative to the body.

In addition, the engagement portion may include a first incline and a second incline having different inclinations with respect to the protrusion portion.

In addition, an inclination between the first incline and the protrusion portion may be less than an inclination between the second incline and the protrusion portion.

In addition, the body may include a deformation portion configured to be movable relative to the opening, and the engagement protrusion protrude from a center portion of the deformation portion.

In addition, the deformation portion may be thinner than portions other than the deformation portion in the body.

In addition, the body may include reinforcement portions formed between the protrusion portion and one surface of the body.

In addition, the reinforcement portions may be symmetrical to each other with respect to the engagement protrusion.

In addition, the housing may include a recess adjacent to the guide and a hole connecting the recess and the guide portion, and the body may be disposed in the recess, and at least a portion of the engagement protrusion may be disposed inside the guide portion through the hole.

In addition, the body may include a protrusion structure (not shown) protruding from the body. In addition, the body and the engagement protrusion may be formed of an elastic material.

An electronic device (e.g., the electronic device 101 in FIG. 1) according to various example embodiments may include: a housing, a guide portion formed in the housing and having a shape corresponding to a pen input device to accommodate the pen input device, a fixing portion including a body disposed in the housing adjacent to the guide portion and an engagement protrusion including a protrusion portion protruding from a first surface of the body wherein at least a portion of the protrusion portion is disposed inside the guide portion and an engagement portion formed at an end of the protrusion portion, and an elastic member comprising an elastic material disposed in the housing supporting a second surface opposite the first surface of the body.

The electronic device may further include a bracket disposed in the housing adjacent to the guide portion accommodating the body of the fixing portion, and including an opening (e.g., the second opening 711 shown in FIG. 9B) formed on a first surface, wherein at least a portion of the engagement protrusion of the fixing portion may pass through the opening formed in the bracket disposed in the guide portion, and wherein the elastic member may be in contact with a second surface opposite the first surface of the bracket wherein the fixing portion is configured to move relative to the bracket, to support the second surface of the body.

In addition, the fixing portion may include a separation prevention portion protruding from a side surface surrounding the first surface and second surface of the body and having a width greater than a width of the opening the bracket.

In addition, the fixing portion may include a protrusion protruding from the second surface of the body, and the elastic member may be disposed to surround the protrusion to support the second surface of the body.

In addition, the engagement portion may include a first incline and a second incline formed to have different inclinations with respect to the protrusion portion.

In addition, an inclination between the first incline and the protrusion portion may be less than an inclination between the second incline and the protrusion portion.

In addition, the engagement protrusion may protrude from the center of the first surface of the body.

In addition, the body may include reinforcement portions formed between the protrusion portion and one surface of the body.

In addition, the reinforcement portions may be symmetrical to each other with respect to the engagement protrusion.

In addition, the housing may include a recess formed at a position adjacent to the guide portion and a hole connecting the recess and the guide portion, and the bracket may be disposed in the recess, and at least a portion of the engagement protrusion may be disposed inside the guide portion through the hole.

While the disclosure has been illustrated and described with reference to various example embodiments, it will be understood that the various example embodiments are intended to be illustrative, not limiting. It will be further understood by those skilled in the art that the scope of the various example embodiments should be understood to encompass all changes or modifications derived from the technical ideas of the various example embodiments of the disclosure, including the appended claims and their equivalents. It should also be understood that any of the embodiment(s) described herein may be used in conjunction with any other embodiment(s) described herein.

What is claimed is:

1. An electronic device comprising:
a housing;
a guide portion formed in the housing having a shape corresponding to a pen input device to accommodate the pen input device; and
a fixing member disposed in the housing and comprising:
a hole disposed in the fixing member and extending from a first surface of the fixing member to a second surface of the fixing member opposite the first surface;
a deformation portion movable relative to the hole and comprising a rubber material; and
an engagement protrusion protruding from the deformation portion and including an engagement portion formed at an end of the engagement protrusion, at least a portion of the engagement protrusion being disposed inside the guide portion,
wherein when at least a portion of the pen input device is inserted into and moved along the guide portion, the deformation portion moves in a first direction through contact of the engagement protrusion with a surface of the pen input device and a size of the hole decreases through deformation of the deformation portion, and
wherein when an engagement groove of the pen input device is positioned at the engagement protrusion, the deformation portion moves in a second direction opposite to the first direction through elastic force and the engagement protrusion is fastened to the engagement groove.

2. The electronic device according to claim 1, wherein the engagement portion comprises a first inclined surface having a first inclination with respect to an insertion direction of the pen input device and a second inclined surface having a second inclination with respect to the insertion direction of the pen input device.

3. The electronic device according to claim 2, wherein the first inclination is less than the second inclination.

4. The electronic device according to claim 1, wherein the engagement protrusion protrudes from the center of the deformation portion.

5. The electronic device according to claim 4, wherein the deformation portion is thinner than portions of the fixing member other than the deformation portion.

6. The electronic device according to claim 1, wherein the fixing member comprises reinforcement portions formed between the engagement protrusion and the deformation portion of the fixing member.

7. The electronic device according to claim 6, wherein the reinforcement portions are symmetrical to each other with respect to the engagement protrusion.

8. The electronic device according to claim 1, wherein the housing comprises a recess formed at a position adjacent to the guide portion, and a hole connecting the recess and the guide portion,
wherein the fixing member is disposed in the recess, and
wherein at least a portion of the engagement protrusion is disposed inside the guide portion through the hole.

9. The electronic device according to claim 8, wherein the fixing member comprises a protrusion protruding from the fixing member.

10. The electronic device according to claim 1, wherein the fixing member and the engagement protrusion comprise an elastic material.

11. An electronic device comprising:
a housing;
a guide portion formed in the housing and having a shape corresponding to a pen input device to accommodate the pen input device;
a fixing member comprising a body disposed in the housing adjacent to the guide portion; and an engagement protrusion protruding from the body and including an engagement portion formed at an end of the engagement protrusion, at least a portion of the engagement protrusion is being disposed inside the guide portion;
a bracket disposed in the housing adjacent to the guide portion and accommodating the body of the fixing member, the bracket including:
an opening formed on a first portion of the bracket; and
an elastic member disposed inside the bracket between a second portion of the bracket facing the first portion of the bracket and the fixing member,
wherein at least a portion of the engagement protrusion of the fixing member passes through the opening of the bracket to be disposed in the guide portion,
wherein the engagement portion comprises a first inclined surface having a first inclination with respect to an insertion direction of the pen input device and a second inclined surface having a second inclination with respect to the insertion direction of the pen input device,
wherein the first inclination is less than the second inclination,
wherein when the pen input device is inserted into the guide portion of the housing, the first inclined surface contacts the pen input device before the second inclined surface,
wherein the first inclined surface contacts the pen input device during insertion of the pen input device into the guide portion of the housing,
wherein when the pen input device is withdrawn from the guide portion of the housing, the second inclined surface exits from an engagement groove of the pen input device before the first inclined surface, and
wherein the second inclined surface contacts the pen input device during withdrawal of the pen input device from the guide portion of the housing.

12. The electronic device according to claim 11, wherein the fixing member comprises a separation prevention portion extending from a side surface surrounding a first surface and a second surface of the body and having a width greater than the width of the opening formed in the bracket.

13. The electronic device according to claim 11, wherein the fixing member comprises a protrusion formed to protrude from the body portion in a direction opposite to the engagement protrusion, and
wherein the elastic member is disposed to surround the protrusion to support the second portion of the body.

14. The electronic device according to claim 11, wherein the engagement protrusion protrudes from a center of the first surface of the body.

15. The electronic device according to claim 11, wherein the body comprises reinforcement portions formed between the engagement portion and one surface of the body.

16. The electronic device according to claim 15, wherein the reinforcement portions are symmetrical to each other with respect to the engagement protrusion.

17. The electronic device according to claim 11, wherein the housing comprises a recess adjacent to the guide portion, and a hole connecting the recess and the guide portion,
  wherein the bracket is disposed in the recess, and
  wherein at least a portion of the engagement protrusion is disposed inside the guide portion through the hole.

* * * * *